US012055396B2

(12) United States Patent
Okamori et al.

(10) Patent No.: US 12,055,396 B2
(45) Date of Patent: Aug. 6, 2024

(54) INFORMATION PROCESSING APPARATUS, MOVING BODY, INFORMATION PROCESSING SYSTEM, INFORMATION PROCESSING METHOD, AND PROGRAM

(71) Applicant: Sony Group Corporation, Tokyo (JP)

(72) Inventors: Atsushi Okamori, Tokyo (JP); Kento Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 265 days.

(21) Appl. No.: 17/630,928

(22) PCT Filed: Jun. 22, 2020

(86) PCT No.: PCT/JP2020/024421
§ 371 (c)(1),
(2) Date: Jan. 28, 2022

(87) PCT Pub. No.: WO2021/024627
PCT Pub. Date: Feb. 11, 2021

(65) Prior Publication Data
US 2022/0205791 A1    Jun. 30, 2022

(30) Foreign Application Priority Data
Aug. 8, 2019    (JP) .................................. 2019-146147

(51) Int. Cl.
*G01C 21/20*    (2006.01)
*B64C 39/02*    (2023.01)
(Continued)

(52) U.S. Cl.
CPC ............ *G01C 21/20* (2013.01); *B64C 39/024* (2013.01); *B64D 47/08* (2013.01); *G05D 1/101* (2013.01);
(Continued)

(58) Field of Classification Search
CPC ...... G01C 21/20; B64C 39/024; B64D 47/08; G05D 1/101; H04N 7/185; H04N 17/002; B64U 10/13; B64U 2101/30
See application file for complete search history.

(56) References Cited
U.S. PATENT DOCUMENTS

2011/0304617 A1\* 12/2011 Nishida ................ A63F 13/837
345/419
2016/0299233 A1\* 10/2016 Levien ................ G08G 5/0052
(Continued)

FOREIGN PATENT DOCUMENTS

JP            6103672 B1    3/2017
JP       2018-173960 A    11/2018
(Continued)

OTHER PUBLICATIONS

International Search Report and Written Opinion mailed on Sep. 1, 2020, received for PCT Application PCT/JP2020/024421, Filed on Jun. 22, 2020, 12 pages including English Translation.
(Continued)

*Primary Examiner* — Sunghyoun Park
(74) *Attorney, Agent, or Firm* — XSENSUS LLP

(57) ABSTRACT

[Object] To propose an information processing apparatus, a moving body, an information processing system, an information processing method, and a program that are capable of capable of ensuring that another moving body does not appear in an imaging range of a moving body.
[Solving Means] An information processing apparatus according to the present technology includes: an acquisition unit; and a control unit. The acquisition unit acquires state information of an imaging unit of a moving body (10). The control unit calculates an imageable region (D) of the imaging unit on the basis of the state information. The
(Continued)

information processing apparatus transmits information regarding the imageable region to a moving body (20).

19 Claims, 16 Drawing Sheets

(51) Int. Cl.
  *B64D 47/08* (2006.01)
  *G05D 1/00* (2006.01)
  *H04N 7/18* (2006.01)
  *H04N 17/00* (2006.01)
  *B64U 10/13* (2023.01)
  *B64U 101/30* (2023.01)

(52) U.S. Cl.
  CPC ........... *H04N 7/185* (2013.01); *H04N 17/002* (2013.01); *B64U 10/13* (2023.01); *B64U 2101/30* (2023.01)

(56) References Cited

U.S. PATENT DOCUMENTS

| | | | |
|---|---|---|---|
| 2016/0371864 A1* | 12/2016 | Gotoh | G06F 9/5083 |
| 2019/0094850 A1* | 3/2019 | Li | B64C 39/024 |
| 2019/0212751 A1* | 7/2019 | Zhou | G05D 1/0246 |
| 2019/0265734 A1* | 8/2019 | Liu | G05D 1/106 |
| 2020/0066142 A1* | 2/2020 | Fowe | G06V 20/182 |

FOREIGN PATENT DOCUMENTS

| | | |
|---|---|---|
| JP | 2019-514236 A | 5/2019 |
| WO | 2019/039099 A1 | 2/2019 |
| WO | 2019/244626 A1 | 12/2019 |

OTHER PUBLICATIONS

Temma et al., "Enhancing Drone Interface Using Spatially Coupled Two Perspectives", Proceedings of Interaction, 2019, pp. 102-111.

* cited by examiner

| Model number | Maximum speed | Maximum ascending speed | Maximum descending speed | Maximum acceleration | Maximum ascending acceleration | Maximum descending acceleration |
|---|---|---|---|---|---|---|
| RX100 | 40km/h | 5m/s | 3m/s | 3m/s$^2$ | 1.5m/s$^2$ | 1m/s$^2$ |
| DR600 | 60km/h | 6m/s | 4m/s | 6m/s$^2$ | 2m/s$^2$ | 1.5m/s$^2$ |
| HX1000 | 50km/h | 6m/s | 4m/s | 5m/s$^2$ | 1.7m/s$^2$ | 1m/s$^2$ |
| ⋮ | | | | | | |

FIG.3

| Model number | Camera horizontal-angle changeable range | Camera vertical-angle changeable range | Camera horizontal-angle change speed | Camera vertical angle-change speed |
|---|---|---|---|---|
| RX100 | −30°~30° | −90°~0° | 12°/s | 30°/s |
| DR600 | −60°~60° | −90°~0° | 24°/s | 90°/s |
| HX1000 | −45°~45° | −90°~0° | 15°/s | 45°/s |
| ... | | | | |

FIG.4

| Model number | Horizontal-angle-of-view changeable range | Vertical-angle-of-view changeable range | Horizontal-angle-of-view change speed | Vertical-angle-of-view change speed |
|---|---|---|---|---|
| RX100 | 4°~85° | 3°~70° | 41°/s | 34°/s |
| DR600 | 26°~45° | 19°~33° | 10°/s | 7°/s |
| HX1000 | 20°~65° | 14°~46° | 23°/s | 16°/s |
| ... | | | | |

FIG.5

| Aircraft ID | Model number | Latitude | Longitude | Altitude | Speed | Direction | Camera horizontal angle | Camera vertical angle | Camera horizontal angle-of-view | Camera vertical angle-of-view | Update date and time |
|---|---|---|---|---|---|---|---|---|---|---|---|
| 1 | HX1000 | 35.61745 | 139.728322 | 100m | 30km/h | 30°/s | 10° | 15° | 20° | 14° | 2019/1/5 13:01:02.30 |
| 1 | HX1000 | 35.61785 | 139.728872 | 70m | 10km/h | 15°/s | 0° | 10° | 85° | 70° | 2019/1/5 13:01:02.10 |
| ... | | | | | | | | | | | |

FIG.6

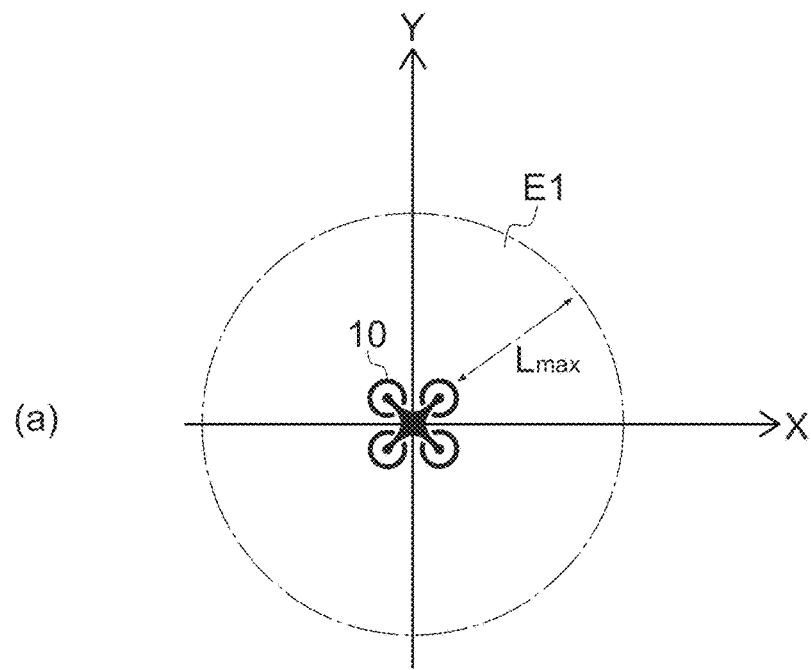
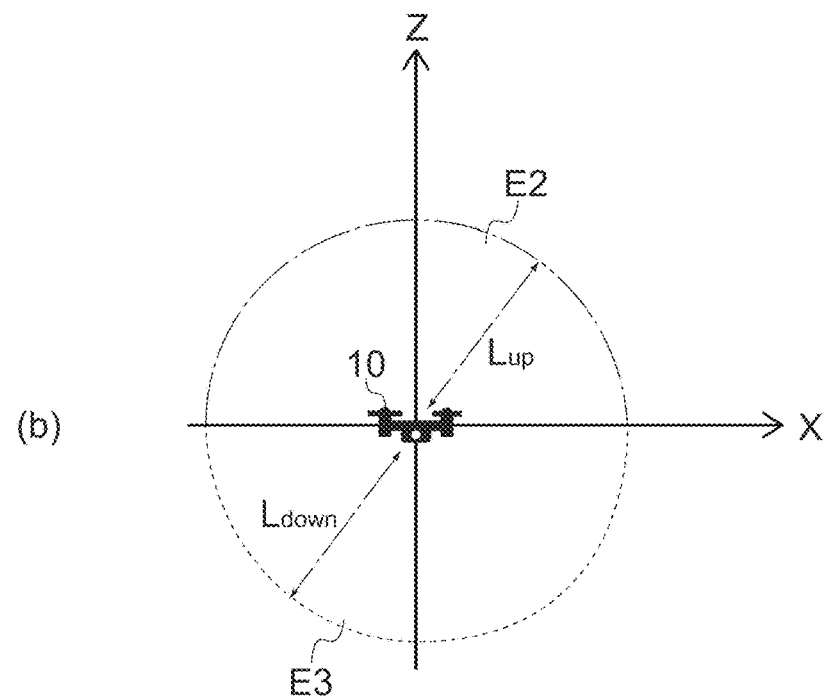
FIG.9

| Aircraft ID | Model number | Latitude | Longitude | Altitude | Speed | Camera horizontal angle | Camera vertical angle | Camera horizontal angle-of-view | Camera vertical angle-of-view | Update date and time |
|---|---|---|---|---|---|---|---|---|---|---|
| 1 | HX1000 | 35.61745 | 139.728322 | 100m | 30km/h | 10° | 15° | 20° | 14° | 2019/1/5 13:01:02.10 |
| | HX1000 | 35.61785 | 139.728872 | 70m | 10km/h | 0° | 10° | 85° | 70° | 2019/1/5 13:01:02.30 |
| | HX1000 | 35.61825 | 139.729422 | 40m | 20km/h | 20° | 5° | 25° | 35° | 2019/1/5 13:01:02.50 |
| | HX1000 | 35.61865 | 139.729972 | 10m | 30km/h | 10° | 10° | 40° | 50° | 2019/1/5 13:01:03.70 |
| | HX1000 | 35.61905 | 139.730522 | 30m | 10km/h | 0° | 15° | 30° | 25° | 2019/1/5 13:01:03.90 |
| | HX1000 | 35.61865 | 139.729972 | 40m | 15km/h | 15° | 10° | 10° | 45° | 2019/1/5 13:01:04.10 |
| | HX1000 | 35.61945 | 139.730522 | 60m | 20km/h | 20° | 5° | 20° | 35° | 2019/1/5 13:01:04.30 |
| | HX1000 | 35.61985 | 139.731072 | 80m | 10km/h | 10° | 10° | 10° | 12° | 2019/1/5 13:01:04.50 |

FIG. 10

Select history information most similar to current aircraft state and current camera state (b)

Select moving region and change ranges of imaging direction and angle of view associated with selected history information (c)

| Aircraft ID | Model number | Latitude | Longitude | Altitude | Speed | Camera horizontal angle | Camera vertical angle | Camera horizontal angle-of-view | Camera vertical angle-of-view | Moving region | Horizontal angle change range | Vertical angle change range | Horizontal angle-of-view change range | Vertical angle-of-view change range | Update date and time |
|---|---|---|---|---|---|---|---|---|---|---|---|---|---|---|---|
| 1 | HX1000 | 35.61745 | 139.728322 | 100m | 30km/h | 10° | 15° | 20° | 14° | | | | | | 2019/1/5 13:01:02.10 |
| | HX1000 | 35.61785 | 139.728872 | 70m | 10km/h | 0° | 10° | 85° | 70° | 3200m³ | 20° | 10° | 65° | 56° | 2019/1/5 13:01:02.30 |
| | HX1000 | 35.61825 | 139.729422 | 40m | 20km/h | 20° | 5° | 25° | 35° | | | | | | 2019/1/5 13:01:02.50 |
| | HX1000 | 35.61865 | 139.729972 | 10m | 30km/h | 10° | 10° | 40° | 50° | | | | | | 2019/1/5 13:01:03.70 |
| | HX1000 | 35.61980 | 139.731068 | 75m | 10km/h | 10° | 12° | 11° | 15° | 6300m³ | 5° | 2° | 30° | 35° | 2019/1/5 13:01:03.90 |
| | HX1000 | 35.61865 | 139.729972 | 40m | 15km/h | 15° | 10° | 10° | 45° | | | | | | 2019/1/5 13:01:04.10 |
| | HX1000 | 35.61945 | 139.730522 | 60m | 20km/h | 20° | 5° | 20° | 35° | | | | | | 2019/1/5 13:01:04.30 |
| | HX1000 | 35.61985 | 139.731072 | 80m | 10km/h | 10° | 10° | 10° | 12° | | | | | | 2019/1/5 13:01:04.50 |

Acquire aircraft state table (a)

FIG. 14

INFORMATION PROCESSING APPARATUS, MOVING BODY, INFORMATION PROCESSING SYSTEM, INFORMATION PROCESSING METHOD, AND PROGRAM

CROSS-REFERENCE TO RELATED APPLICATIONS

The present application is based on PCT filing PCT/JP2020/024421, filed Jun. 22, 2020, which claims priority to Japanese Application No. 2019-146147, filed Aug. 8, 2019, the entire contents of each are incorporated herein by reference.

TECHNICAL FIELD

The present technology relates to an information processing apparatus, a moving body, an information processing system, an information processing method, and a program.

BACKGROUND ART

In the past, a technology for manipulating a remote-controlled moving body such as a drone has been disclosed. Such a moving body is generally equipped with a camera for imaging a subject (for example, Patent Literature 1). In recent years, it has been proposed to utilize, in the case where such a moving body is used to perform aerial imaging of scenery or remote patrol security, for example, a system including a plurality of moving bodies.

CITATION LIST

Patent Literature

Patent Literature 1: Japanese Patent No. 6103672

DISCLOSURE OF INVENTION

Technical Problem

However, in the system including a plurality of moving bodies, when the imaging range of one moving body is unknown, the other moving body appears in the imaging range of the one moving body.

In this regard, the present disclosure proposes an information processing apparatus, a moving body, an information processing system, an information processing method, and a program that are capable of capable of ensuring that another moving body does not appear in an imaging range of a moving body.

Solution to Problem

In order to achieve the above-mentioned object, an information processing apparatus according to an embodiment of the present technology includes: an acquisition unit; and a control unit.

The acquisition unit acquires state information of an imaging unit of a moving object.

The control unit calculates an imageable region of the imaging unit on the basis of the state information.

The information processing apparatus transmits information regarding the imageable region to a moving body.

The acquisition unit may acquire the state information of the moving object and performance information of the moving object, and the control unit may calculate the imageable region on the basis of the acquired state information and the acquired performance information of the moving object and the acquired state information of the imaging unit.

The control unit may calculate a movable region of the moving object on the basis of the acquired state information of the moving object and the acquired performance information of the moving object, and calculate the imageable region on the basis of the calculated movable region.

The state information of the moving object may include information regarding a current position of the moving object, the performance information of the moving object may include information regarding a maximum speed, a maximum ascending speed, a maximum descending speed, maximum acceleration, maximum ascending acceleration, and maximum descending acceleration of the moving object, and the control unit may calculate a movable region of the moving object on the basis of at least one of the maximum speed, the maximum ascending speed, the maximum descending speed, the maximum acceleration, the maximum ascending acceleration, or the maximum descending acceleration, and the current position.

The acquisition unit may acquire performance information of the imaging unit, and the control unit may calculate an imageable range of the imaging unit on the basis of the state information and the performance information of the imaging unit.

The state information of the imaging unit may include information regarding an imaging direction and an angle of view of the imaging unit, the performance information of the imaging unit may include information regarding a changeable range and a change speed of the imaging direction of the imaging unit and information regarding an angle-of-view changeable range and an angle-of-view change speed of the imaging unit, and the control unit may calculate the imageable range on the basis of the imaging direction, the angle of view, the changeable range, the change speed, the angle-of-view changeable range, and the angle-of-view change speed.

The control unit may calculate the imageable range every predetermined period of time, and calculate the imageable region on the basis of the imageable range calculated every predetermined period of time.

The information processing apparatus may be a server.

In order to achieve the above-mentioned object, a moving body according to an embodiment of the present technology includes: an acquisition unit; and a control unit.

The acquisition unit acquires information regarding an imageable region of an imaging unit of a moving object, the imageable region being calculated on the basis of state information of the imaging unit.

The control unit generates a moving route of the moving body, the moving route not intersecting the imageable region.

The moving body may be a flying object.

In order to achieve the above-mentioned object, a moving body according to an embodiment of the present technology includes: an acquisition unit; and a control unit.

The acquisition unit acquires state information of an imaging unit of a moving object.

The control unit calculates an imageable region of the imaging unit on the basis of the state information and generates a moving route of the moving body, the moving route not intersecting the imageable region.

The moving body may be a flying object.

In order to achieve the above-mentioned object, an information processing system according to an embodiment of the present technology includes: an information processing apparatus; and a moving body.

The information processing apparatus acquires state information of an imaging unit of a moving object and calculates an imageable region of the imaging unit on the basis of the state information.

The moving body acquires information regarding the imageable region from the information processing apparatus and generates a moving route of the moving body, the moving route not intersecting the imageable region.

In order to achieve the above-mentioned object, an information processing method for an information processing apparatus according to an embodiment of the present technology includes:

acquiring state information of an imaging unit of a moving object.

An imageable region of the imaging unit is calculated on the basis of the state information.

Information regarding the imageable region is transmitted to a moving body.

In order to solve the problems described above, a program according to an embodiment of the present technology causes an information processing apparatus to execute the steps of:

acquiring state information of an imaging unit of a moving object;

calculating an imageable region of the imaging unit on the basis of the state information; and transmitting information regarding the imageable region to a moving body.

BRIEF DESCRIPTION OF DRAWINGS

FIG. 3 is an example of a data table in which the model number of a drone aircraft and aircraft performance are associated with each other.

FIG. 4 is an example of a data table in which the model number of a drone aircraft and aircraft performance are associated with each other.

FIG. 5 is an example of a data table in which the model number of a drone aircraft and aircraft performance are associated with each other.

FIG. 6 is a diagram showing an example of a data table showing the current airframe state of the drone aircraft.

FIG. 9 is a conceptual diagram showing the maximum moving range of a drone aircraft in the horizontal direction and the vertical plane direction.

FIG. 10 is an example of a data table showing the update history of the aircraft state of the drone aircraft.

FIG. 14 is an example of a data table showing an aircraft state of a drone aircraft and the update history of the change range of the actual imaging direction and the actual angle of view of a camera.

MODE(S) FOR CARRYING OUT THE INVENTION

Hereinafter, embodiments of the present technology will be described with reference to the drawings.

First Embodiment

[Configuration of Information Processing System]

Figure 1:
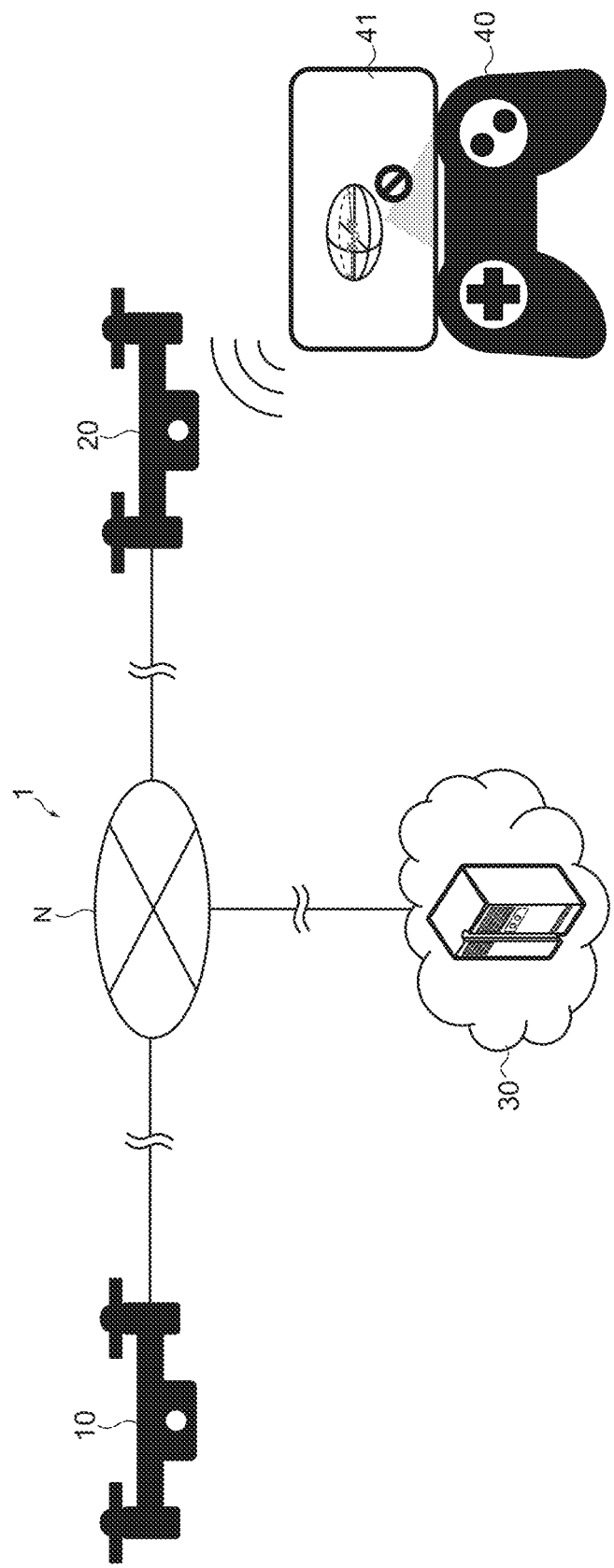
FIG. 1 is a schematic diagram showing a configuration example of an information processing system according to a first embodiment.
Figure 2:
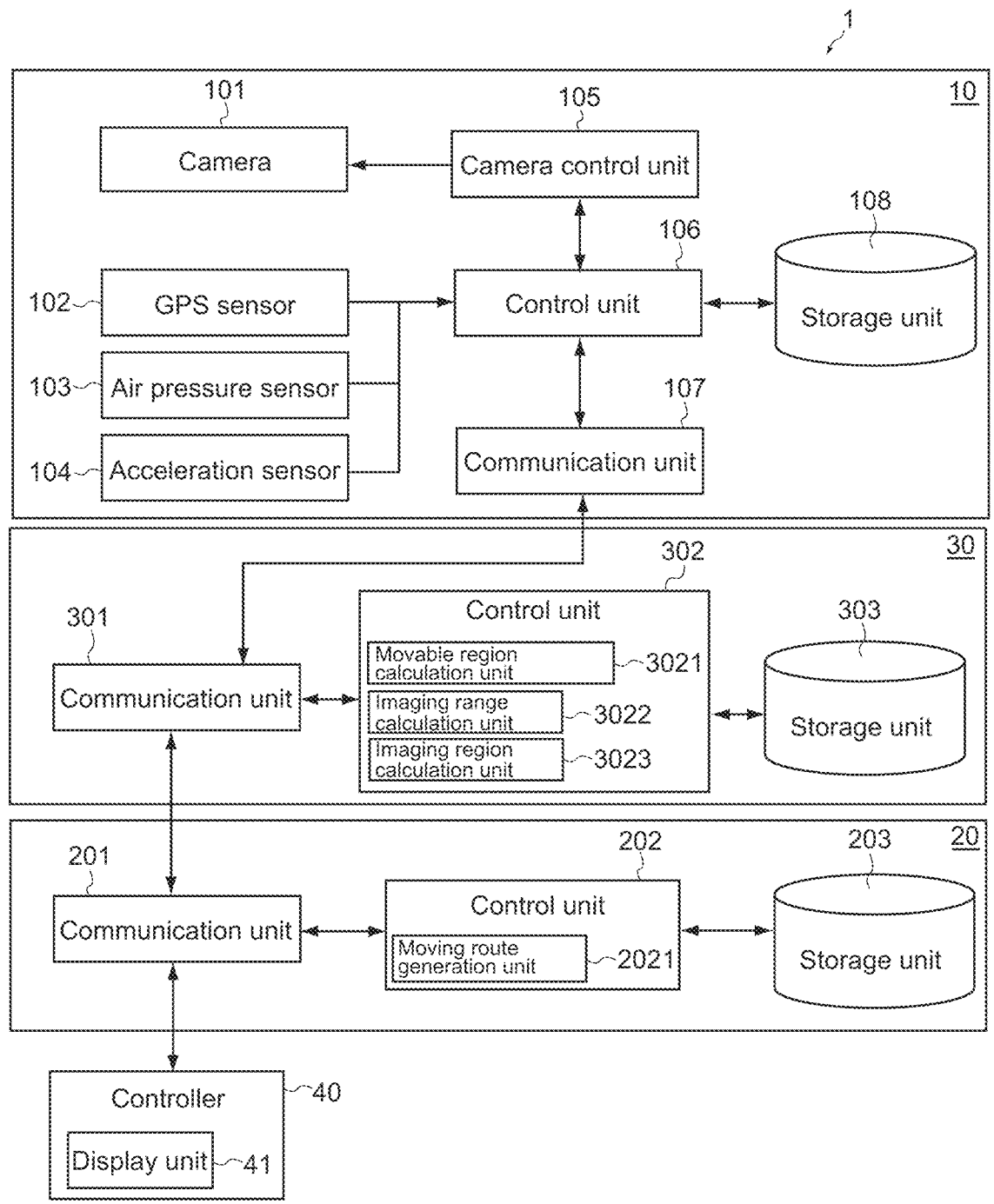
FIG. 2 is a block diagram showing a configuration example of the information processing system.

FIG. 1 is a schematic diagram showing a configuration example of an information processing system 1 according to a first embodiment, and FIG. 2 is a block diagram showing a configuration example of the information processing system 1. As shown in FIG. 1, the information processing system 1 includes drone aircrafts 10 and 20, the information processing apparatus 30, and a controller 40.

The drone aircrafts 10 and 20 and the information processing apparatus 30 are communicably connected to each other via a network N. The network N may be the Internet, a mobile communication network, a local area network, or the like, or may be a network in which a plurality of types of the networks are combined.

The drone aircraft 20 and the controller 40 are connected to each other by wireless communication. The communication standard for connecting the second drone aircraft 20 and the controller 40 to each other is typically LTE (Long Term Evolution) communication, but is not limited thereto. The type thereof is not limited, and may be, for example, Wi-Fi.

(Drone Aircraft 10)

As shown in FIG. 2, the drone aircraft 10 includes a camera 101, a GPS sensor 102, an air pressure sensor 103, an acceleration sensor 104, a camera control unit 105, a control unit 106, a communication unit 107, and a storage unit 108. The drone aircraft 10 is an example of the "moving object" in the claims.

The camera 101 is an apparatus for generating a captured image by imaging a real space using, for example, an image sensor such as a CMOS (Complementary Metal Oxide Semiconductor) and a CCD (Charge Coupled Device), and various members such as a lens for controlling formation of a subject image on the image sensor. The camera 101 may capture a still image or may capture a moving image. The camera 101 is an example of the "imaging unit" in the claims.

The GPS sensor 102 receives a signal from a GPS satellite and measures the current latitude and longitude of the drone aircraft 10 in real time. The GPS sensor 102 outputs, to the storage unit 108 and a movable region calculation unit 3021, sensor data regarding the latitude and longitude of the drone aircraft 10 calculated on the basis of the signal acquired from the GPS satellite.

The air pressure sensor 103 is a pressure sensor that measures an air pressure and converts it to an altitude to measure a flight altitude (air pressure altitude) of the drone aircraft 10. The air pressure sensor 103 detects a total pressure including an influence of wind received by the drone aircraft 10 and the atmospheric pressure received by the drone aircraft 10, and measures a flight speed (airspeed) of the drone aircraft 10 on the basis of a difference therebetween.

The air pressure sensor 103 outputs, to the storage unit 108 and the movable region calculation unit 3021, the sensor data obtained by measuring the flight altitude and the flight speed of the drone aircraft 10. The air pressure sensor 103 may be, for example, a piezoresistive pressure sensor, and the type thereof is not limited.

The acceleration sensor 104 constantly detects the acceleration of the drone aircraft 10. The acceleration sensor 104 detects various types of movement such as a tilt and vibration of the drone aircraft 10. The acceleration sensor 104 outputs, to the storage unit 108 and the movable region calculation unit 3021, the sensor data obtained by detecting the acceleration of the drone aircraft 10. The acceleration sensor 104 may be, for example, a piezoelectric acceleration sensor, a servo-type acceleration sensor, a strain-type acceleration sensor, a semiconductor-type acceleration sensor, or the like, and the type thereof is not limited.

The camera control unit 105 generates a control signal for changing the imaging direction, posture, and imaging magnification of the camera 101 on the basis the control of the control unit 106, and outputs this signal to the camera 101. The camera control unit 105 controls the imaging direction and the angle of view of the camera 101 via, for example, a platform (not shown) including a built-in motor, such as a 3-axis gimbal, and outputs the control signal at this time to the storage unit 108 and an imaging range calculation unit 3022.

The control unit 106 controls the entire operation of the drone aircraft 10 or part thereof in accordance with a program stored in the storage unit 108. The communication unit 107 communicates with the information processing apparatus 30 through the network N. The communication unit 107 functions as a communication interface of the drone aircraft 10.

The storage unit 108 stores sensor data output from the GPS sensor 102, the air pressure sensor 103, and the acceleration sensor 104, and a control signal output from the camera control unit 105.

(Drone Aircraft 20)

As shown in FIG. 2, the drone aircraft 20 includes a communication unit 201, a control unit 202, and a storage unit 203. The drone aircraft 20 is an example of the "moving body" in the claims.

The communication unit 201 communicates with the information processing apparatus 30 via the network N. The communication unit 201 functions as a communication interface of the drone aircraft 20. The control unit 202 controls the entire operation of the drone aircraft 20 or part thereof in accordance with a program stored in the storage unit 203.

The control unit 202 functionally includes a moving route generation unit 2021. The moving route generation unit 2021 sets, on the basis of the imaging region of the drone aircraft 10, a waypoint that is an intermediate target point of the drone aircraft 20, and generates a moving route of the drone aircraft 20 that goes through the set waypoint.

(Information Processing Apparatus 30)

As shown in FIG. 2, the information processing apparatus 30 includes a communication unit 301, a control unit 302, and a storage unit 303. The information processing apparatus 30 is typically a cloud server, but is not limited thereto. For example, the information processing apparatus 30 may be another arbitrary computer such as a PC.

The communication unit 301 communicates with the drone aircrafts 10 and 20 via the network N. The communication unit 301 functions as a communication interface of the information processing apparatus 30.

The control unit 302 controls the entire operation of the information processing apparatus 30 or part thereof in accordance with a program stored in the storage unit 303.

The control unit 302 functionally includes the movable region calculation unit 3021, the imaging range calculation unit 3022, and an imaging region calculation unit 3023.

The movable region calculation unit 3021 calculates, on the basis of the sensor data (the latitude, the longitude, and the altitude of the drone aircraft 10) acquired from the GPS sensor 102 and the air pressure sensor 103 and the aircraft performance of the drone aircraft 10 (maximum speed, maximum ascending speed, maximum acceleration, maximum ascending acceleration, and maximum descending acceleration), a movable region in which the drone aircraft 10 is movable.

Note that the sensor data acquired from the GPS sensor 102 and the air pressure sensor 103 is an example of the "state information of the moving object" in the claims, and the aircraft performance of the drone aircraft 10 is an example of the "performance information of the moving object" in the claims.

The imaging range calculation unit 3022 calculates, on the basis of the control signal (the imaging direction and the angle of view of the camera 101) acquired from the camera control unit 105 and the aircraft performance of the camera 101 (the changeable range and the change speed of the imaging direction of the camera 101 and the changeable range and the change speed of the angle of view of the camera 101), the imageable range of the camera 101. Note that the control signal from the camera control unit 105 is an example of the "state information of the imaging unit", and the aircraft performance of the camera 101 is an example of the "performance information of the imaging unit".

The imaging region calculation unit 3023 superimposes, on the basis of the movable region of the drone aircraft 10 calculated by the movable region calculation unit 3021 and the imageable range of the camera 101 calculated by the imaging range calculation unit 3022, all the imageable ranges calculated from the angle of view and the imaging direction of the camera 101 obtained at the corresponding time at each point of the movable region to calculate the imageable region of the drone aircraft 10.

The storage unit 303 stores data (FIG. 3) in which the model number and the aircraft performance of each of a plurality of drone aircrafts are associated with each other. The storage unit 303 stores data (FIGS. 4 and 5) in which the model number of each of the plurality of drone aircrafts and the aircraft performance of the camera 101 are associated with each other.

FIG. 3 is an example of a data table in which the model number of a drone aircraft and aircraft performance are associated with each other. FIGS. 4 and 5 are each an example of a data table in which the model number of a drone aircraft and aircraft performance of the camera 101 are associated with each other. Note that the specific numerical values described in FIG. 3 to FIG. 6, FIG. 10, and FIG. 13 are merely an example, and it goes without saying that the numerical values are not limited to these numerical values.

Further, the storage unit 303 periodically acquires the current state of the drone aircraft 10 and the camera 101 from the drone aircraft 10 and stores this. Specifically, the storage unit 303 periodically acquires, from the drone aircraft 10, information regarding the current latitude, longitude, altitude, and speed of the drone aircraft 10 and information regarding the current horizontal angle (angle formed by the optical axis of the camera 101 and the vertical plane), the vertical angle (angle formed by the optical axis of the camera 101 and the horizontal direction), the horizontal angle of view, and the vertical angle of view of the camera 101, and updates this.

FIG. 6 is an example of a data table representing the current aircraft state of the drone aircraft 10. The storage unit 303 according to this embodiment stores the current aircraft state of the drone aircraft 10 as, for example, a data table as shown in FIG. 6, and periodically updates this data table.

Further, the storage unit 303 stores a time interval from when acquiring an aircraft state table described below to when setting a waypoint (hereinafter, the predetermined time period $t_1$), the update interval of the aircraft state table (hereinafter, the predetermined time period $t_2$), and the local feature amount of each of a plurality of drone aircrafts.

(Controller 40)

The controller 40 is a manipulation apparatus for manipulating the drone aircraft 20 and includes a display unit 41. The display unit 41 is, for example, a display device such as an LCD and an organic EL display.

The display unit 41 displays video taken by a camera 116 mounted on the drone aircraft 20. As a result, a user can operate the drone aircraft 20 while watching the video displayed on the display unit 41.

(Hardware Configuration)

Figure 7:
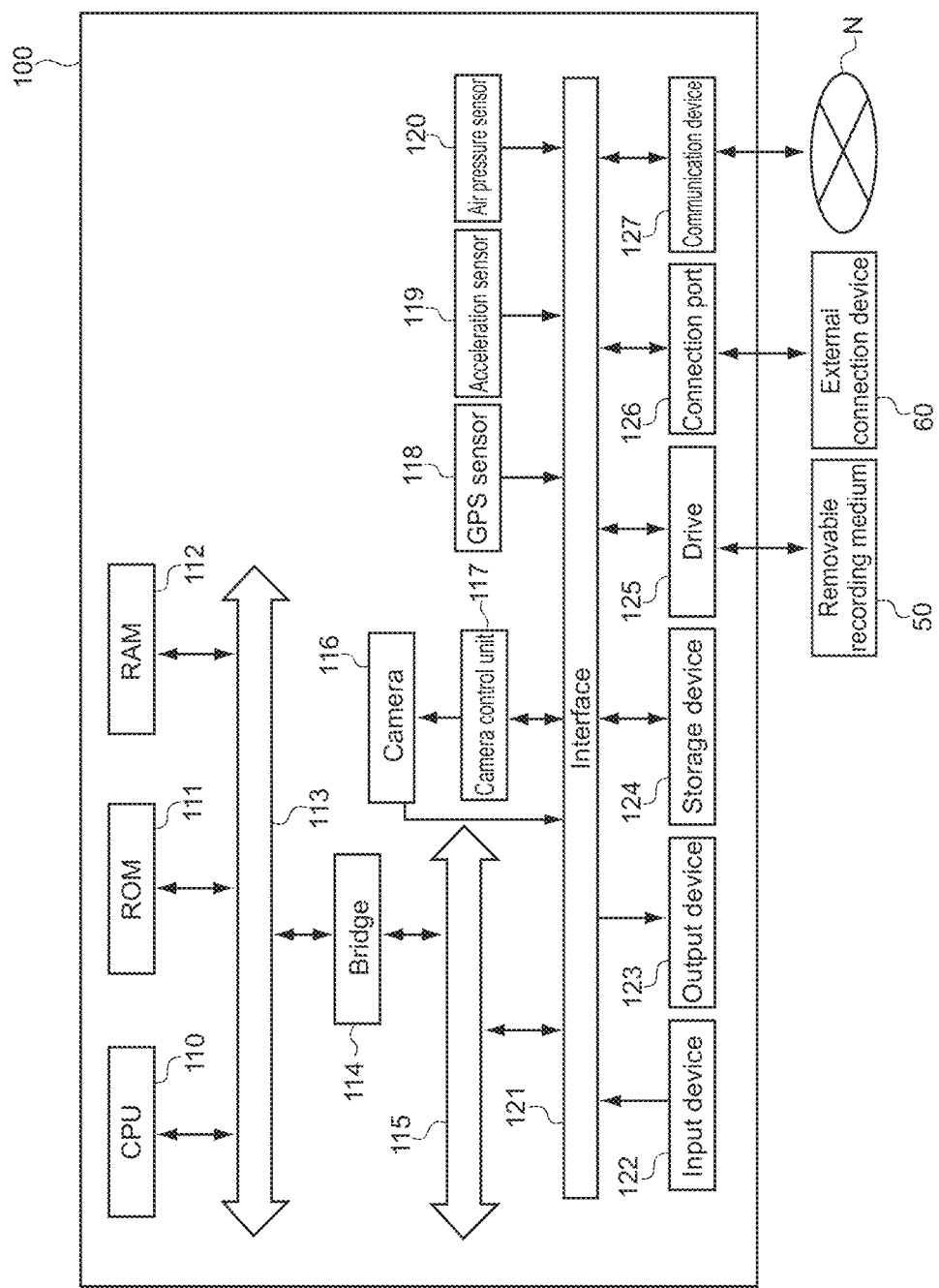
FIG. 7 is a block diagram showing a hardware configuration example of a drone aircraft and an information processing apparatus.

FIG. 7 is a block diagram showing a hardware configuration example of the drone aircrafts 10 and 20 and the information processing apparatus 30. The drone aircrafts 10 and 20 and the information processing apparatus 30 may be realized by an information processing apparatus 100.

The information processing apparatus 100 includes a CPU (Central Processing unit) 110, a ROM (Read Only Memory) 111, and a RAM (Random Access Memory) 112. The control units 106, 202, and 302 may be the CPU 111.

Further, the information processing apparatus 100 may include a host bus 113, a bridge 114, an external bus 115, an interface 121, an input device 122, an output device 123, a storage device 124, a drive 125, a connection port 126, and a communication device 127.

Further, the information processing apparatus 100 may include a camera control unit 117, a camera 116, a GPS sensor 118, an acceleration sensor 119, and an air pressure sensor 120.

The information processing apparatus 100 may include a processing circuit such as a DSP (Digital Signal Processor), an ASIC (Application Specific Integrated Circuit), an FPGA (Field-Programmable Gate Array), and a GPU (Graphics Processing Unit) Instead of or in addition to the CPU 110.

The CPU 110 functions an arithmetic processing unit and a control device, and controls the entire operation of the information processing apparatus 100 or part thereof in accordance with various programs stored in the ROM 111, the RAM 112, the storage device 124, or s removable recording medium 50. The storage units 108, 203, and 303 may be the ROM 111, the RAM 112, the storage device 124, or the removable recording medium 50.

The ROM 111 stores the program, the calculation parameter, and the like used by the CPU 110. The RAM 112 primarily stores the program used in the execution of the CPU 110, the parameter that appropriately changes in the execution, and the like.

The CPU 110, the ROM 111, and the RAM 112 are connected to each other via the host bus 113 including an internal bus such as a CPU bus. Further, the host bus 113 is connected to the external bus 115 such as a PCI (Peripheral Component Interconnect/Interface) bus via the bridge 114.

The input device 122 is a device operated by a user, such as a touch panel, a button, a switch, and a lever. The input device 122 may be, for example, a remote control device using infrared rays or other radio waves, or an external connection device 60 such as a mobile phone corresponding to the operation of the information processing apparatus 100.

The input device 122 includes an input control circuit that generates an input signal on the basis of information input by a user and outputs the signal to the CPU 110. A user operates this input device 122 to input various types of data to the information processing apparatus 100 and instruct a processing operation.

The output device 123 includes a device capable of notifying a user of the acquired information using senses such as visual, auditory, and haptic senses. The output device 123 may be, for example, a display device such as an LCD (Liquid Crystal Display) and an organic EL (Electro-Luminescence) display, an audio output device such as a speaker and a headphone, or a vibrator.

The output device 123 outputs the result obtained by the processing of the information processing apparatus 100 as a text, video such as an image, voice such as voice and sound, vibration, or the like.

The storage device 124 is a device for data storage configured as an example of the storage unit of the information processing apparatus 100. The storage device 124 includes, for example, a magnetic storage device such as an HDD (Hard Disk Drive), a semiconductor storage device, an optical storage device, or a magneto-optical storage device. The storage device 124 stores, for example, the program to be executed by the CPU 110, various types of data, various types of data acquired from the outside, and the like.

The drive 125 is a reader/writer for the removable recording medium 50 such as a magnetic disk, an optical disk, a magneto-optical disk, and a semiconductor memory, and is built in or externally attached to the information processing apparatus 100. The drive 125 reads the information recorded in the removable recording medium 50 mounted thereon, and outputs the read information to the RAM 112. Further, the drive 125 writes a record to the removable recording medium 50 mounted thereon.

The connection port 126 is a port for connecting a device to the information processing apparatus 100. The connection port 126 may be, for example, a USB (Universal Serial Bus) port, an IEEE1394 port, or an SCSI (Small Computer System Interface) port. Further, the connection port 126 may be an RS-232C port, an optical audio terminal, an HDMI (registered trademark) (High-Definition Multimedia Interface) port, or the like. By connecting the external connection device 60 to the connection port 126, various types of data can be exchanged between the information processing apparatus 100 and the external connection device 60.

The communication device 127 is, for example, a communication interface including a communication device for connecting to the network N. The communication device 127 may be, for example, a communication card for a LAN (Local Area Network), Bluetooth (registered trademark), Wi-Fi, WUSB (Wireless USB), or LTE. Further, the communication device 127 may be a router for optical communication, a router for ADSL (Asymmetric Digital Subscriber Line), a modem for various types of communication, or the like.

The communication device 127 transmits/receives signals or the like to/from, for example, the Internet or another communication device using a predetermined protocol such as TCP/IP. Further, the network N to be connected to the communication device 127 is a wirelessly-connected network, and may include, for example, the Internet, infrared communication, radio wave communication, short-range wireless communication, or satellite communication. The communication units 107, 201, and 301 may be the communication device 127.

The camera control unit 117, the camera 116, the GPS sensor 118, the acceleration sensor 119, and the air pressure sensor 120 respectively correspond to the camera control unit 105, the camera 101, the GPS sensor 102, the acceleration sensor 104, and the air pressure sensor 103.

The configuration example of the information processing system 1 has been described above. The respective components described above may be configured by using general-purpose members or may be configured by members specialized for functions of the respective components. Such a configuration may be changed as appropriate depending on the technical level at the time of implementation.

[Operation of Information Processing System]

Figure 8:
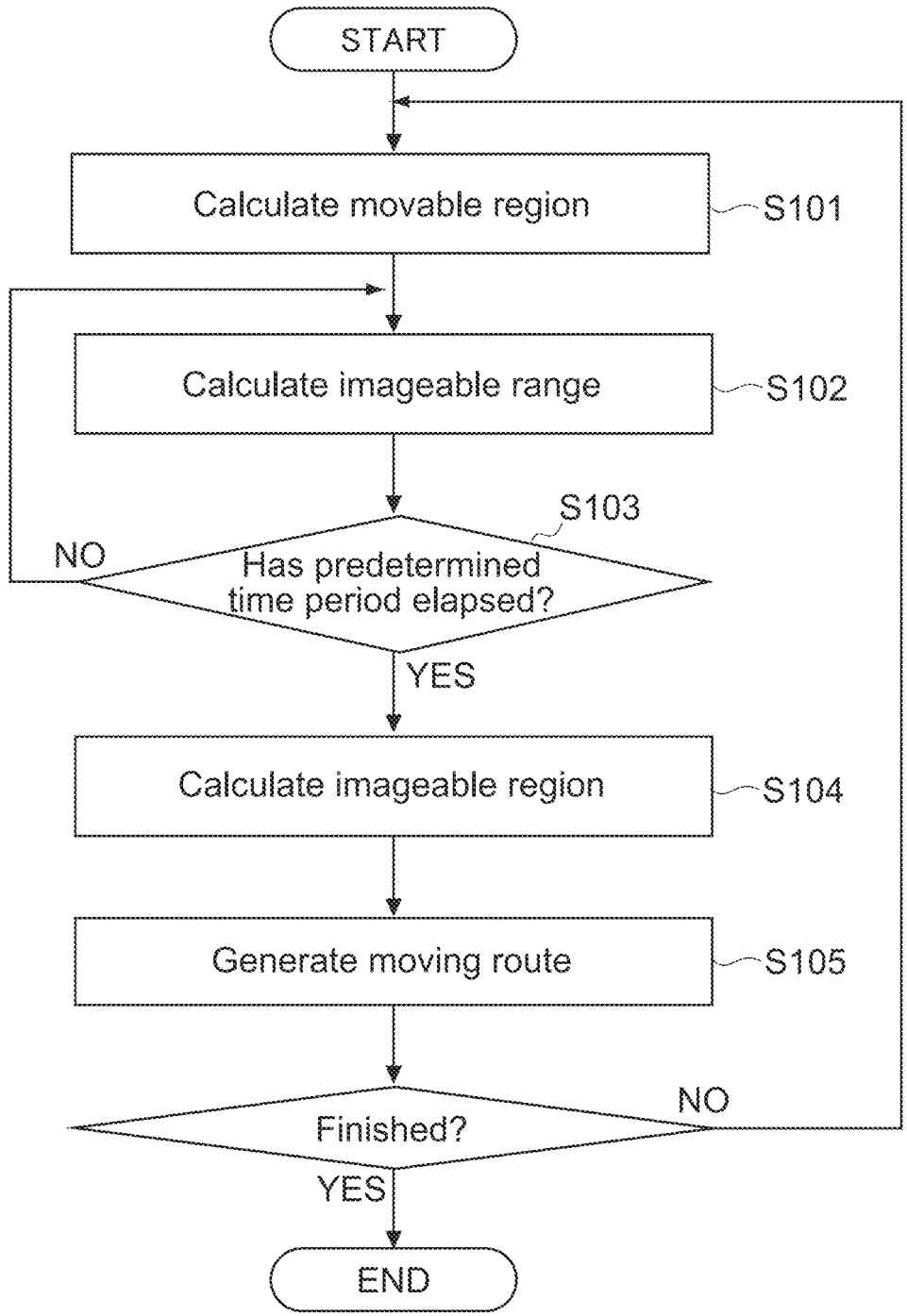
FIG. 8 is a flowchart showing flow of a typical operation of the information processing system.

FIG. 8 is a flowchart showing flow of a typical operation of the information processing system 1. Hereinafter, the operation of the information processing system 1 will be described with reference to FIG. 8 as appropriate.

(Step S101: Calculate Movable Region)

First, the camera 116 mounted on the drone aircraft 20 images the drone aircraft 10. Next, the movable region calculation unit 3021 performs predetermined image processing on the captured image obtained by imaging the drone aircraft 10 to specify the model name or the model number of the drone aircraft 10. Specifically, the movable region calculation unit 3021 extracts the local feature amount of the 3D shape of the drone aircraft 10 from the captured image obtained by imaging the drone aircraft 10.

The local feature amount is, for example, a feature mount calculated by SIFT (scale invariant feature transform), SURF (speed-up robust features), RIFF (rotation invariant fast feature), BREIF (binary robust independent elementary features), BRISK (binary robust invariant scalable keypoints), ORB (oriented FAST and rotated BRIEF), or CARD (compact and real-time descriptors).

The movable region calculation unit 3021 detects the drone aircraft 10 by feature amount matching in which the local feature amount of the 3D shape of the drone aircraft 10 and the local feature amount of each of a plurality of drone aircrafts stored in the storage unit 303 in advance are compared with each other, thereby specifying the model name or the model number of the drone aircraft 10.

Next, the movable region calculation unit 3021 acquires, from the drone aircraft 10, data (hereinafter, the aircraft state table) (see FIG. 6) in which sensor data obtained by sensing the latitude and longitude of the drone aircraft 10 by the GPS sensor 102, sensor data obtained by sensing the altitude and the current speed of the drone aircraft 10 by the air pressure sensor 103, and data regarding the current imaging direction (the horizontal angle, the vertical angle) and the angle of view (the horizontal angle of view, the vertical angle of view) of the camera 101 are associated with each other.

Subsequently, the movable region calculation unit 3021 refers to the data table (FIG. 3) stored in the storage unit 303 to read, from the storage unit 303, the aircraft performance (maximum speed, maximum ascending speed, maximum descending speed, maximum acceleration, maximum ascending acceleration, and maximum descending acceleration) of the drone aircraft 10 and the time period $t_1$ associated with the model number or the model name specified previously.

Next, the movable region calculation unit 3021 calculates a maximum moving range E1 in the horizontal direction (XY plane direction) in the case of accelerating at the maximum acceleration from the current speed to the maximum speed, which is the upper limit, of the drone aircraft 10 starting from the current position (the latitude, the longitude, and the altitude) of the drone aircraft 10.

Part a of FIG. 9 is a conceptual diagram showing the maximum moving range E1 of the drone aircraft 10 in the horizontal direction. The maximum moving range E1 is calculated by, for example, the following formulae (1) and (2), $V_0$, $a_h$, and $L_h$ respectively representing the current speed, the maximum acceleration, and the maximum moving distance of the drone aircraft 10. Note that X, Y, and Z axes in FIG. 9 are three-axis directions perpendicular to each other, and are common in the following figures.

$$L_h = V_0 t_1 + (a_h t_1^2)/2 \quad (1)$$

$$E1 = (L_h)^2 \pi \quad (2)$$

Next, the movable region calculation unit 3021 calculates a maximum ascending range E2 in the vertical plane direction (XZ plane direction) in the case of ascending at the maximum ascending acceleration from the current speed to the maximum ascending speed, which is the upper limit, of the drone aircraft 10 starting from the current position (the latitude, the longitude, and the altitude) of the drone aircraft 10.

Part b of FIG. 9 is a conceptual diagram showing the maximum ascending range and the maximum descending range of the drone aircraft 10 in the vertical plane direction. The maximum ascending range E2 is calculated by, for example, the following formulae (3) and (4), $V_0$, $a_{up}$, and $L_{up}$ respectively representing the current speed, the maximum ascending acceleration, and the maximum ascending distance of the drone aircraft 10.

$$L_{up} = V_0 t_1 + (a_{up} t_1^2)/2 \quad (3)$$

$$E2 = \{(L_{up})^2 \pi\}/2 \quad (4)$$

Similarly, the movable region calculation unit 3021 calculates a maximum descending range E3 in the vertical plane direction in the case of descending at the maximum descending speed from the current speed to the maximum descending speed, which is the upper limit, of the drone aircraft 10 starting from the current position (the latitude, the longitude, and the altitude) of the drone aircraft 10.

The maximum descending range E3 is calculated by, for example, the following formulae (5) and (6), $V_{down}$, $a_{down}$, and $L_{down}$ respectively representing the current speed, the maximum descending acceleration, and the maximum descending distance of the drone aircraft 10.

$$L_{down} = V_0 t_1 + (a_{down} t_1^2)/2 \quad (5)$$

$$E3 = \{(L_{down})^2 \pi\}/2 \quad (6)$$

Subsequently, the movable region calculation unit 3021 combines the calculated maximum moving range E1, the calculated maximum ascending range E2, and the calculated maximum descending range E3 with each other to calculate a maximum movable region E defined by these ranges, and thus specifies the maximum movable region E of the drone aircraft 10 within the predetermined time period $t_1$. The movable region calculation unit 2051 outputs the calculation result of calculating the maximum movable region E to the moving route generation unit 2021. The maximum movable region E is an example of the "movable region" in the claims.

The maximum movable region E may be defined as a cylinder calculated by, for example, the following formula (7), $L_h$, $L_{up}$, and $L_{down}$ respectively representing the maximum moving distance, the maximum ascending distance, and the maximum descending distance.

$$E = \{L_{up} + L_{down}\} * (L_h)^2 * \pi \quad (7)$$

Alternatively, as shown in FIG. 1, the maximum movable region E may be defined as an elliptical sphere calculated by, for example, the following formula (8).

$$E = 4/3 * \pi * [(L_h)^2 * \{(L_{up} + L_{down})/2\}] \quad (8)$$

(Step S102: Calculate Imageable Range)

The imaging range calculation unit 3022 refers to the data table (FIG. 4) stored in the storage unit 303 to read, from the storage unit 303, the aircraft performance (the horizontal-angle changeable range, the horizontal-angle change speed, the vertical-angle changeable range, the vertical angle-change speed, the horizontal-angle-of-view changeable range, the horizontal-angle-of-view change speed, the vertical-angle-of-view changeable range, and the vertical-angle-of-view change speed of the camera 101) of the camera 101 and the time period t2 associated with the model number or the model name specified in the previous Step S101.

Next, the imaging range calculation unit 3022 calculates a maximum angle range A1 in the horizontal direction of the camera 101 within the predetermined time period $t_2$ starting from the current horizontal angle of the camera 101 acquired in the previous Step S101 to the horizontal-angle changeable range that is the upper limit.

The maximum angle range A1 is calculated by, for example, the following formula (9), $\theta_H$, $\theta_{Hs}$, and $\theta_{H(min)}$ to $\theta_{H(max)}$ respectively representing the current horizontal angle, the horizontal-angle change speed, and the horizontal-angle changeable range of the camera 101.

$$\theta_H - (\theta_{Hs} * t_2) \leq A1 \leq \theta_H + (\theta_{Hs} * t_2) \text{ (However, } \theta_{H(min)} \leq A1 \leq \theta_{H(max)}) \quad (9)$$

Subsequently, the imaging range calculation unit 3022 calculates a maximum angle range A2 in the vertical direction of the camera 101 within the predetermined time period $t_2$ starting from the current vertical angle of the camera 101 to the vertical-angle changeable range that is the upper limit.

The maximum angle range A2 is calculated by, for example, the following formula (10), $\theta_V$, $\theta_{Vs}$, and $\theta_{V(min)}$ to $\theta_{V(max)}$ respectively representing the current vertical angle, the vertical angle-change speed, and the vertical-angle changeable range of the camera 101.

$$\theta_V - (\theta_{Vs} * t_2) \leq A2 \leq \theta_V + (\theta_{Vs} * t_2) \text{ (However, } \theta_{V(min)} \leq A2 \leq \theta_{V(max)}) \quad (10)$$

Subsequently, the imaging range calculation unit 3022 calculates a maximum horizontal angle of view $\theta_{hav}$ of the camera 101 within the predetermined time period $t_2$ starting from the current horizontal angle of view of the camera 101 to the horizontal-angle-of-view changeable range that is the upper limit.

The maximum horizontal angle of view $\theta_{hav}$ is calculated by, for example, the following formula (11), $\theta_{AH}$, $\theta_{AHs}$, and $\theta_{AH(min)}$ to $\theta_{AH(max)}$ respectively representing the current horizontal angle of view, the horizontal-angle-of-view change speed, and the horizontal-angle-of-view changeable range of the camera 101.

$$\theta_{AH} - (\theta_{AHs} * t_2) \leq \theta_{hav} \leq \theta_{AH} + (\theta_{AHs} * t_2) \text{ (however, } \theta_{AH(min)} \leq \theta_{hav} \leq \theta_{AH(max)}) \quad (11)$$

Similarly, the imaging range calculation unit 3022 calculates a maximum vertical angle of view $\theta_{vav}$ of the camera 101 within the predetermined time period $t_2$ starting from the current vertical angle of view of the camera 101 to the vertical-angle-of-view changeable range that is the upper limit.

The maximum vertical angle of view $\theta_{vav}$ is calculated by, for example, the following formula (12), $\theta_{VH}$, $\theta_{VHs}$, and $\theta_{VH(min)}$ to $\theta_{V(max)}$ respectively representing the current vertical angle of view, the vertical-angle-of-view change speed, and the vertical-angle-of-view changeable range of the camera 101.

$$\theta_{VH} - (\theta_{VHs} * t_2) \leq \theta_{vav} \leq \theta_{VH} + (\theta_{VHs} * t_2) \text{ (however, } \theta_{VH(min)} \leq \theta_{vav} \leq \theta_{VH(max)}) \quad (12)$$

Next, the imaging range calculation unit 2052 calculates a maximum imageable range R on the basis of the maximum angle ranges A1 and A2, the maximum horizontal angle of view $\theta_{hav}$, and the maximum vertical angle of view $\theta_{vav}$, and specifies the maximum imageable range R within the predetermined time period $t_2$ from the current imaging direction and the current angle of view of the camera 101. Note that the maximum imageable range R is an example of the "imageable range" in the claims.

(Step S103: Has Predetermined Time Period Elapsed?)

FIG. 10 is an example of a data table showing the update history of the aircraft state table, and is a diagram showing the process of generating the maximum movable region E, the maximum imageable range R, a maximum imageable region D, and a waypoint P with time.

The imaging range calculation unit 3022 according to this embodiment repeats the previous Step S102 every predetermined time period $t_2$ in the case where the predetermined time period $t_1$ has not elapsed since the aircraft state table was acquired from the drone aircraft 10 (NO in Step S103). As a result, the aircraft state table stored in the storage unit 303 is updated every predetermined time period $t_2$.

That is, the imaging range calculation unit 3022 calculates the maximum imageable range R each time the aircraft state table is acquired from the drone aircraft 10 from when the drone aircraft 20 acquired the aircraft state table to when the predetermined time period $t_1$ elapsed. That is, as shown in FIG. 10, the imaging range calculation unit 3022 calculates, every predetermined time period $t_2$, the maximum imageable range R corresponding to the imaging direction (the horizontal angle, the vertical angle) and the angle of view (the horizontal angle of view, the vertical angle of view) of the camera 101 at that time. The imaging range calculation unit 3022 outputs the calculation result of calculating the maximum imageable range R evert predetermined time period $t_2$ to the imaging region calculation unit 3023.

(Step S104: Calculate Imageable Region)

In the case where the predetermined time period $t_1$ has elapsed since the aircraft state table was acquired from the drone aircraft 10 (Yes in Step S103), the imaging region calculation unit 3023 superimposes all the maximum imageable ranges R calculated by the imaging range calculation unit 3022 every predetermined time period $t_2$ to calculate the maximum imageable region D, and thus calculates the maximum imageable region D of the camera 101 within the predetermined time period $t_1$. The maximum imageable region D is an example of the "imageable region" in the claims.

Figure 12:
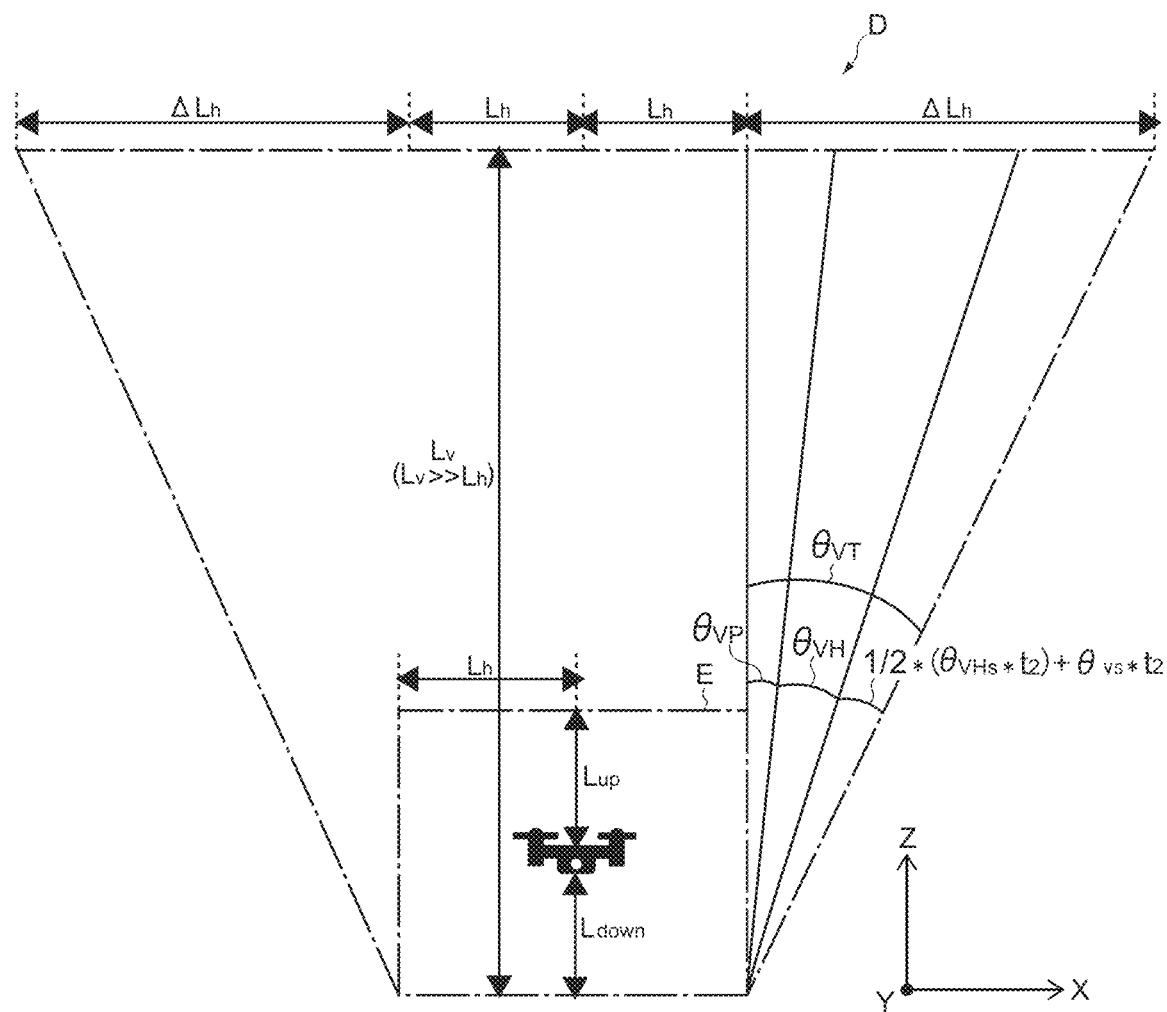
FIG. 12 a diagram schematically showing the cross section of the maximum imaging region.

FIG. 12 is a diagram schematically showing the cross section of the maximum imageable region D. In the case where the maximum movable region E is defined as a cylinder calculated by, for example, the formula (7), the imaging region calculation unit 3023 may be defined as a truncated cone calculated by, for example, the following formulae (13) to (15), $\theta_{VP}$ and $L_V$ respectively representing the vertical tilt angle of the drone aircraft 10 and the height of the maximum imageable region D.

$$\theta_{VT} = \theta_{VP} + \theta_{VH} + \{\tfrac{1}{2}*(\theta_{VHs}*t_2) + (\theta_{Vs}*t_2)\} \tag{13}$$

$$\Delta L_h = L_V * \tan \theta_{VT} \tag{14}$$

$$D = \{(\pi * L_V)/3\} * [L_h{}^2 * \{L_h*(L_h + \Delta L_h))\} * (L_h + \Delta L_h)^2] \tag{15}$$

Note that the height $L_V$ of the maximum imageable region D is such a height that the camera 101 of the drone aircraft 10 cannot recognize the drone aircraft 20 (not appear), and is calculated by, for example, the following formula (16), Ds, F, and $F_V$ respectively representing the lateral size of the image sensor of the camera 101, the focal length of the camera 101 at the maximum zoom, and the field of view size of the camera 101.

$$L_V = (F \cdot F_V)/Ds \tag{16}$$

The imaging region calculation unit 3023 outputs the calculation result of calculating the maximum imageable region D to the moving route generation unit 2021 and the controller 40.

The display unit 41 of the controller 40 displays the maximum imageable region D of the drone aircraft 10. At this time, the display unit 41 generates an overlay image in which the maximum imageable region D is virtually superimposed on the video taken by the camera 116, and displays this image. As a result, a user can recognize the maximum imageable region D of the drone aircraft 10 as visualized information.

(Step S105: Generate Moving Route)

Figure 11:
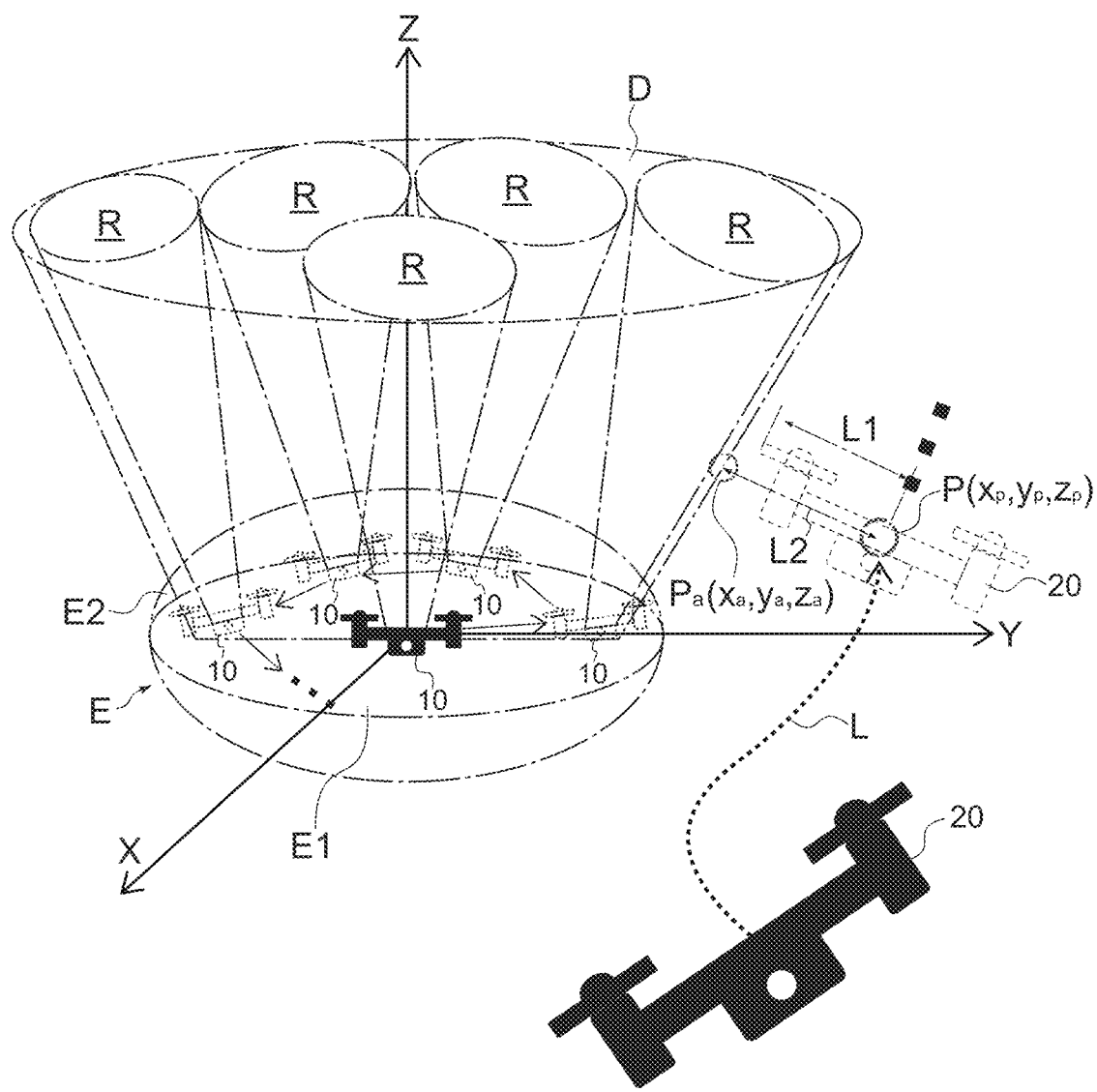
FIG. 11 is a diagram showing a situation in which the drone aircraft flies while avoiding the maximum imaging region of another aircraft.

FIG. 11 is a diagram showing a situation in which the drone aircraft 20 flies so as not to intersect the maximum imageable region D of the drone aircraft 10. The moving route generation unit 2021 sets the waypoint P (intermediate target point) so as not to be included in a virtual obstacle, the maximum movable region E and the maximum imageable region D of the drone aircraft 10 being the virtual obstacle, and generates a moving route L that goes through the waypoint P. At this time, the moving route generation unit 2021 generates the moving route L in accordance with a path search algorithm such as A* (A star) and D* (D star).

Specifically, for example, the moving route generation unit 2021 calculates the coordinate positions ($x_p$, $y_p$, and $z_p$) of the waypoint P on the basis of the coordinate position of each point of the point cloud data forming the maximum movable region E and an aircraft width L1 of the drone aircraft 20 and generates the moving route L that goes through this coordinate position ($x_p$, $y_p$, and $z_p$).

At this time, the moving route generation unit 2021 sets, in the case where the moving route L passes through the center of the drone aircraft 20 in the width direction, the coordinate position ($x_p$, $y_p$, and $z_p$) such that, for example, a distance L2 between a coordinate position ($x_a$, $y_a$, and $z_a$) of the point cloud data forming the outermost periphery of the maximum imageable region D and the coordinate position ($x_p$, $y_p$, and $z_p$) is larger than the aircraft width L1. Note that the aircraft width L1 is, for example, a distance from the center of the drone aircraft 20 in the width direction to the end in the width direction.

The information processing system 1 according to this embodiment repeatedly executes the series of processes from the previous Step S101 to Step S105 every predetermined time period $t_1$. As a result, the maximum imageable region D of the drone aircraft 10 according to the situation at that time is generated every predetermined time period $t_1$, and the waypoint P is intermittently set every predetermined time period $t_1$.

[Operation and Effects]

The information processing apparatus 30 generates the maximum imageable range R every predetermined time period $t_2$ within the range in which the drone aircraft 10 is capable of moving to the maximum within the predetermined time period $t_1$, and calculates, from these maximum imageable ranges R, the maximum imageable range (the maximum imageable region D) of the drone aircraft 10 within the predetermined time period $t_1$. The drone aircraft 10 then generates the moving route L that does not intersect the imaging range.

As a result, even in the case where the drone aircraft 10 takes an unexpected operation such as a sudden rise or a sudden drop within the predetermined time period $t_1$, the imaging range of the camera 101 falls within the maximum imageable region D. Therefore, when the drone aircraft 20 moves in accordance with the moving route L avoiding the maximum movable region E and the maximum imageable region D, it is possible to reliably prevent the drone aircraft 20 from appearing in the imaging range of the camera 101 within the predetermined time period $t_1$.

Further, in the information processing system 1 according to this embodiment, the information processing apparatus 30 executes the arithmetic processing of calculating the maximum movable region E and the maximum imageable region D of the drone aircraft 10. That is, the information processing apparatus 30 is responsible for part of the arithmetic processing to be executed by the drone aircraft 20 in order to prevent the drone aircraft 20 from appearing in the imaging range of the drone aircraft 10. As a result, it is possible to significantly reduce the calculation load of the drone aircraft 20. Further, since it is not necessary to increase the arithmetic processing capacity of the drone aircraft 20, the design cost of the drone aircraft 20 is reduced.

Second Embodiment

[Operation of Information Processing System]

Figure 13:
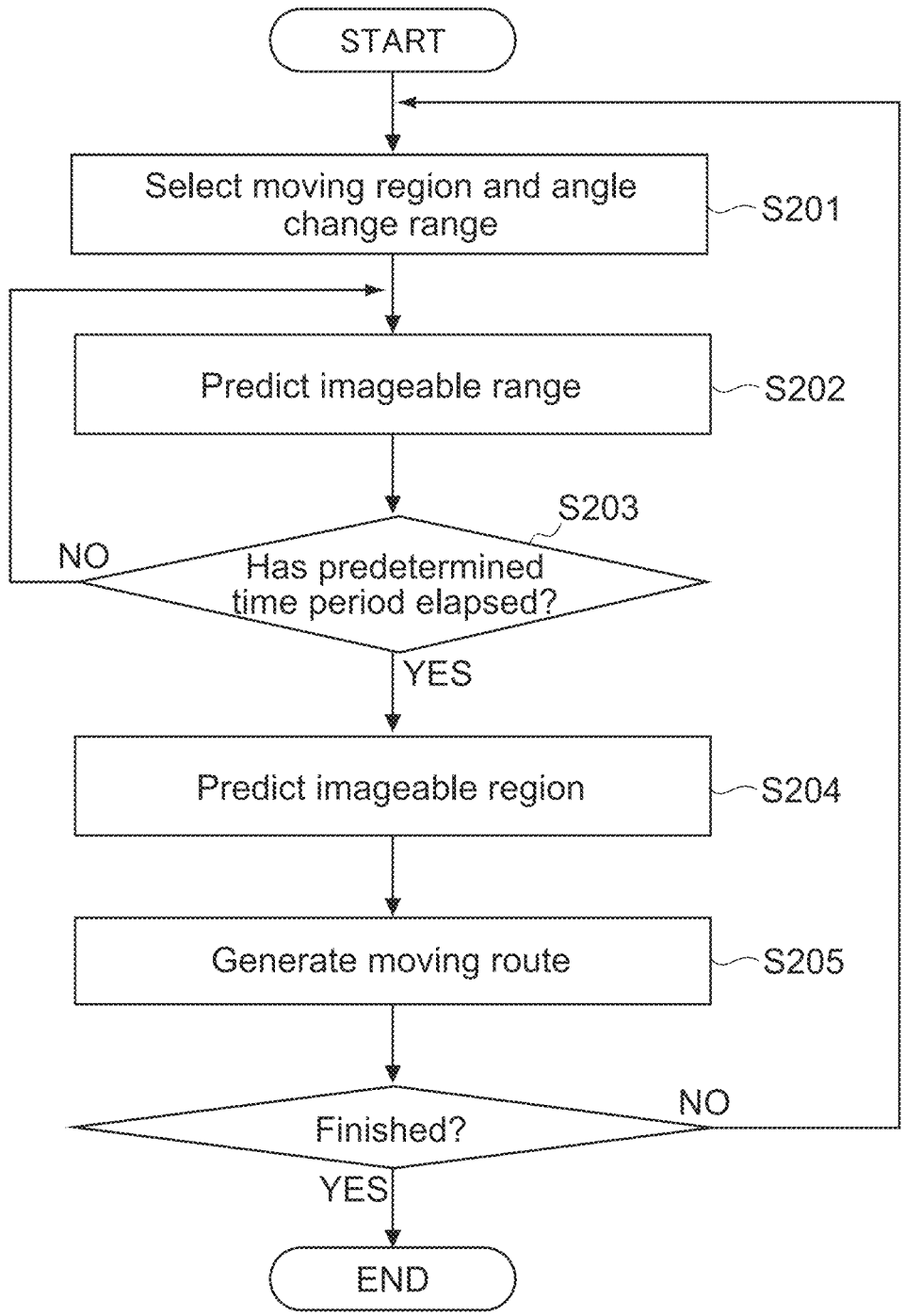
FIG. 13 is a flowchart showing flow of a typical operation of an information processing system according to a second embodiment.

FIG. 13 is a flowchart showing flow of a typical operation of the information processing system 1 according to a second embodiment. The information processing system 1 is capable of executing the following Steps in addition to the operation described in the first embodiment. Hereinafter, the operation of the information processing system 1 according to the second embodiment will be described with reference to FIG. 12 as appropriate. Note that components similar to those of the first embodiment will be denoted by the same reference symbols, and description thereof will be omitted.

The second embodiment is different from the first embodiment in that the imageable region that the drone aircraft 10 is capable of taking within a specific time period is predicted from the past history of the state of the drone aircraft 10, and the drone aircraft 20 avoids the predicted imageable region.

(Step S201: Select Moving Region and Angle Change Range)

FIG. 14 is an example of a data table showing the aircraft state table and the update history of the change range of the actual imaging direction and the actual angle of view of the camera 101. The storage unit 303 according to the second embodiment stores, as a data table, for example, as shown in FIG. 14, the update history of data in which the aircraft state table, the moving region, the horizontal angle change range, the vertical angle change range, the horizontal-angle-of-view change range, and the vertical-angle-of-view change range are associated with each other, and updates this data table every predetermined time period $t_2$.

Here, the "moving region" shown in FIG. 14 is a moving range in which the drone aircraft 10 has actually moved within the predetermined time period $t_1$, the same applies to the following description.

Further, the "horizontal angle change range" is the actual change range of the horizontal angle of the camera 101 within the predetermined time period $t_1$, and the "vertical angle change range" is the actual change range of the vertical angle of the camera 101 within the predetermined time period $t_1$.

Further, the "horizontal-angle-of-view change range" is the actual change range of the horizontal angle of view of the camera 101 within the predetermined time period $t_1$, and the vertical-angle-of-view change range is the actual change range of the vertical angle of view of the camera 101 within the predetermined time period $t_1$. Note that the definitions of the above-mentioned "horizontal angle change range", "vertical angle change range", "horizontal-angle-of-view change range", and "vertical-angle-of-view change range" are the same also in the following description.

First, the control unit 302 acquires, from the drone aircraft 10, the aircraft state table showing the current state of the drone aircraft 10 (Part a in FIG. 14).

Next, the control unit 302 refers to the data table (FIG. 13) stored in the storage unit 303 to select, from the update history of the data table (FIG. 13), history information most similar to the current latitude, longitude, altitude, and speed of the drone aircraft 10 and the current horizontal angle, vertical angle, horizontal angle of view, and vertical angle of view of the camera 101 (Part b of FIG. 14).

Subsequently, the control unit 302 selects the moving region, the horizontal angle change range, the vertical angle change range, the horizontal-angle-of-view change range, and the vertical-angle-of-view change range associated with the selected history information (Part c of FIG. 14).

(Step S202: Predict Imageable Range)

The imaging range calculation unit 3022 predicts an angle range A1' of the camera 101 in the horizontal direction within the predetermined time period $t_2$, starting from the current horizontal angle of the camera 101 to the horizontal-angle changeable range that is the upper limit.

The angle range A1' is calculated by, for example, the following formula (16) $\theta_H$, $\theta_{Ha}$, and $\theta_{H(min)}$ to $\theta_{H(max)}$ respectively representing the current horizontal angle, the horizontal angle change range, and the horizontal-angle changeable range of the camera 101.

$$\theta_H-(\theta_{Ha}/2) \le A1' \le \theta_H+(\theta_{Ha}/2) \text{ (However, } \theta_{H(min)} \le A1' \le \theta_{H(max)}) \quad (16)$$

Subsequently, the imaging range calculation unit 3022 predicts an angle range A2' of the camera 101 in the vertical direction within the predetermined time period $t_2$, starting from the current vertical angle of the camera 101 to the vertical-angle changeable range that is the upper limit.

The angle range A2' is calculated by, for example, the following formula (17), $\theta_V$, $\theta_{Va}$, and $\theta_{V(min)}$ to $\theta_{V(max)}$ respectively representing the current vertical angle, the vertical angle change range, and the vertical-angle changeable range of the camera 101.

$$\theta_V-(\theta_{Va}/2) \le A2' \le \theta_V+(\theta_{Va}/2) \text{ (however, } \theta_{V(min)} \le A2' \le \theta_{V(max)}) \quad (17)$$

Subsequently, the imaging range calculation unit 3022 predicts a horizontal angle of view $\theta_{hav}'$ of the camera 101 within the predetermined time period $t_2$, starting from the current horizontal angle of view of the camera 101 to the horizontal-angle-of-view changeable range that is the upper limit.

The horizontal angle of view $\theta_{hav}'$ is calculated by, for example, the following formula (18), $\theta_{AH}$, $\theta_{AHa}$, and $\theta_{AH(min)}$ to $\theta_{AH(max)}$ respectively representing the current horizontal angle of view, the horizontal-angle-of-view change range, and the horizontal-angle-of-view changeable range of the camera 101.

$$\theta_{AH}-(\theta_{AHa}/2) \le \theta_{hav}' \le \theta_{AH}+(\theta_{AHa}/2) \text{ (however, } \theta_{AH(min)} \le A2' \le \theta_{AH(max)}) \quad (18)$$

Similarly, the imaging range calculation unit 3022 calculates a vertical angle of view $\theta_{vav}'$ of the camera 101 within the predetermined time period $t_2$, starting from the current vertical angle of view of the camera 101 to the vertical-angle-of-view changeable range that is the upper limit.

The vertical angle of view $\theta_{vav}'$ is calculated by, for example, the following formula (19), $\theta_{VH}$, $\theta_{VHa}$, and $\theta_{VH(min)}$ to $\theta_{VH(max)}$ respectively representing the current vertical angle of view, the vertical-angle-of-view change range, and the vertical-angle-of-view changeable range of the camera 101.

$$\theta_{VH}-(\theta_{VH}/2) \le \theta_{hav}' \le \theta_{VH}+(\theta_{VHa}/2) \text{ (However, } \theta_{VH(min)} \le \theta_{hav}' \le \theta_{VH(max)}) \quad (19)$$

Next, the imaging range calculation unit 3022 calculates an imageable range R' on the basis of the angle ranges A1' and A2', the horizontal angle of view $\theta_{hav}'$, and the vertical angle of view $\theta_{vav}'$, and predicts the imageable range R' within the predetermined time period $t_2$ from the current imaging direction and the current angle of view of the camera 101.

(Step S203: Has Predetermined Time Period Elapsed?)

The imaging range calculation unit 3022 repeats the previous Step S202 every predetermined time period $t_2$ in the case where the predetermined time period $t_1$ has not elapsed since the aircraft state table was acquired from the drone aircraft 10 (No in Step S203). As a result, the data table (FIG. 14) stored in the storage unit 303 is updated every predetermined time period $t_2$.

That is, the imaging range calculation unit 3022 predicts the imageable range R' each time the aircraft state table is acquired from the drone aircraft 10 from when the drone aircraft 20 acquired the aircraft state table to when the predetermined time period $t_1$ elapsed. That is, the imaging range calculation unit 3022 outputs, every the predetermined time period $t_2$, the imageable range R' corresponding to the imaging direction (the horizontal angle, the vertical angle) and the angle of view (the horizontal angle of view, the vertical angle of view) of the camera 101 at that time. The imaging range calculation unit 3022 outputs, to the imaging region calculation unit 3023, the calculation result of calculating the imageable range R' every predetermined time period $t_2$.

(Step S204: Predict Image Region)

The imaging region calculation unit 3023 superimposes all the imageable ranges R' calculated by the imaging range calculation unit 3022 every predetermined time period $t_2$ to predict an imageable region D' in the case where the predetermined time period $t_1$ has elapsed since the aircraft state table was acquired from the drone aircraft 10 (YES in Step S203). The imaging region calculation unit 3023 calculates the imageable region D' of the camera 101 within the predetermined time period $t_1$, similarly to the first embodiment, and outputs, to the controller 40, the calculation result of calculating the imageable region D'.

The display unit 41 of the controller 40 displays the imageable region D' of the drone aircraft 10. At this time, the display unit 41 generates an overlay image in which the imageable region D' is virtually superimposed on the video taken by the camera 119, and displays this image. As a result, a user can recognize the imageable region D' of the drone aircraft 10 as visualized information.

(Step S205: Generate Moving Route)

Figure 15:
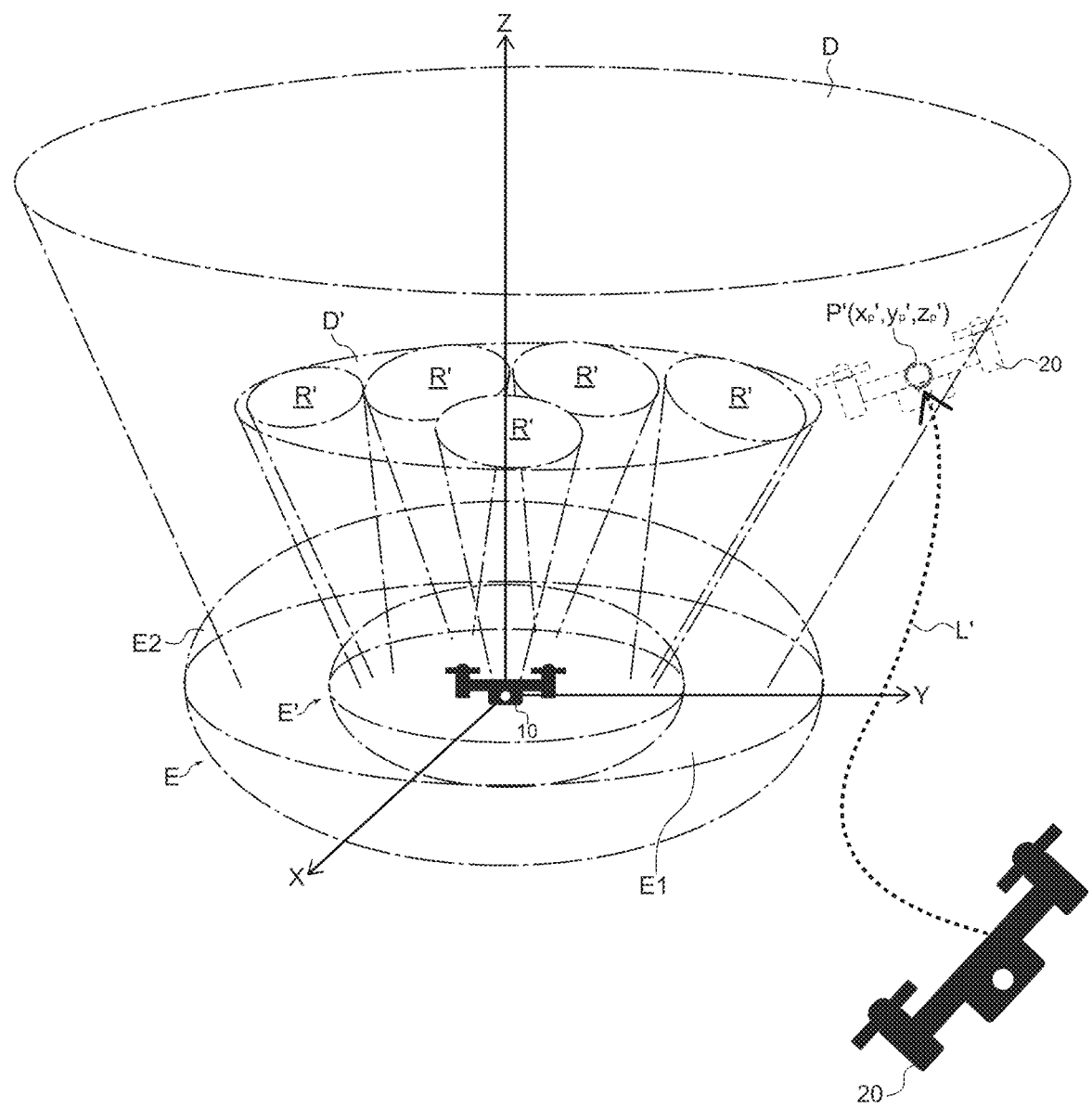
FIG. 15 is a diagram showing a situation in which the drone aircraft flies while avoiding a predicted imaging region of another aircraft.

FIG. 15 is a diagram showing a situation in which the drone aircraft 20 flies while avoiding the imageable region D' of the drone aircraft 10. The imaging region calculation unit 3023 refers to the aircraft performance (e.g., maximum speed, maximum ascending speed, maximum descending speed, maximum acceleration, maximum ascending acceleration, and maximum descending acceleration) of the drone aircraft 20 stored in the storage unit 303 to determine whether to generate a moving route avoiding the maximum imageable region D or the imageable region D'.

Specifically, the imaging region calculation unit 3023 determines whether or not the waypoint P that is not included in the maximum imageable region D can be set from the aircraft performance of the drone aircraft 20. In the case where such a waypoint P can be set, the moving route generation unit 2021 sets the waypoint P that is not included in the maximum imageable region D and generates the moving route L in which the drone aircraft 20 goes through the waypoint P, similarly to the above-mentioned first embodiment.

Meanwhile, the imaging region calculation unit 3023 outputs, in the case of determining that the waypoint P that is not included in the maximum imageable region D cannot be set from the aircraft performance of the drone aircraft 20, the calculation result of calculating the imageable region D' to the moving route generation unit 2021.

The moving route generation unit 2021 calculates a coordinate position ($x_p'$, $y_p'$, and $z_p'$) of a waypoint P' avoiding a virtual obstacle, the imageable region D' and the moving region selected in the previous Step S201 being the virtual obstacle, and generates a moving route L' that goes through this coordinate position ($x_p'$, $y_p'$, and $z_p'$).

The information processing system 1 according to the second embodiment repeatedly executes the series of processes from the previous Step S201 to Step S205 every predetermined time period $t_1$. As a result, the imageable region D' of the drone aircraft 10 according to the situation at that time is predicted every predetermined time period $t_1$, and the waypoint P' is intermittently set every predetermined time period $t_1$.

[Operation and Effects]

The information processing apparatus 30 according to the second embodiment selects, from the history of the change range in which the imaging direction (the horizontal angle change range, the vertical angle change range) and the angle of view (the horizontal-angle-of-view change range, the vertical-angle-of-view change range) of the camera 101 are actually changed, the change range associated with history information most similar to the current imaging direction (the horizontal angle, the vertical angle) and the current angle of view (the horizontal angle of view, the vertical angle of view) of the camera 101, and calculates the imaging region D' of the camera 101 on the basis of the selected change range. The drone aircraft 20 then generates a moving route L' that does not intersecting the imageable region D'.

As a result, it is possible to prevent the drone aircraft 20 from appearing in the imaging range of the drone aircraft 10 within the predetermined time period $t_1$ while considering the past operation tendency and imaging tendency of a user manipulating the drone aircraft 10.

Further, the information processing apparatus 30 according to the second embodiment determines, on the basis of the aircraft performance of the drone aircraft 20, whether to generate a moving route that avoids the maximum imageable region D or the imageable region D'. Here, the information processing apparatus 30 generates, in the case of determining that a moving route that avoids the maximum imageable region D cannot be generated, the moving route L' that avoids the imageable region D'.

As a result, since the moving route L' can be set even in the case where the moving route L that avoids the maximum imageable region D cannot be set, the flexibility when preventing the drone aircraft 20 from appearing in the imaging range of the drone aircraft 10 is improved.

Third Embodiment

Figure 16:
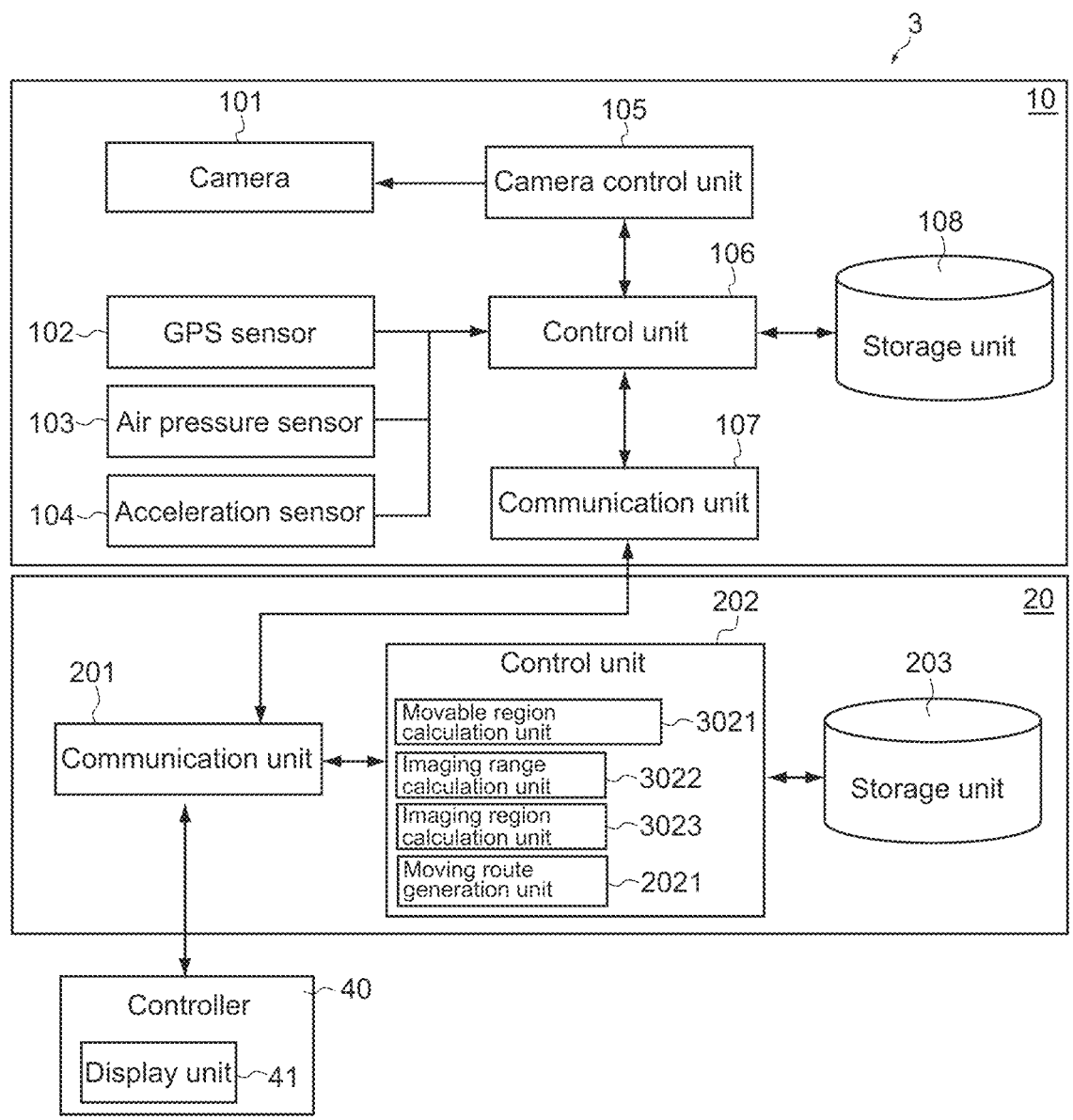
FIG. 16 is a block diagram showing a configuration example of an information processing system according to a third embodiment.

FIG. 16 is a block diagram showing a configuration example of an information processing system 3 according to a third embodiment of the present technology. Hereinafter, the components similar to those of the first embodiment will be denoted by the same reference symbols, and description thereof will be omitted or simplified.

The third embodiment is different from the first embodiment in that in the case where, for example, the arithmetic processing capacity itself of the drone aircraft 20 has improved or the drone aircraft 20 cannot communicate with the information processing apparatus 30, the drone aircraft 20 consistently executes the processing of calculating the maximum imageable region D of the drone aircraft 10 and generating the moving route of itself that does not intersect this maximum imageable region D.

[Configuration of Drone Aircraft]

As shown in FIG. 16, the control unit 202 of the drone aircraft 20 according to the third embodiment functionally includes the moving route generation unit 2021, the movable region calculation unit 3021, the imaging range calculation unit 3022, and the imaging region calculation unit 3023.

[Operation of Information Processing System]

The information processing system 3 according to the third embodiment executes the operation according to the flowchart shown in FIG. 8. Note that the information processing system 3 operates in the same manner as that in the first embodiment except that the drone aircraft 20 consistently executes the processing of calculating the maximum imageable region D of the drone aircraft 10 and generating the moving route of itself that does not intersect this maximum imageable region D, and therefore, description thereof will be omitted.

Modified Example

Although the embodiments of the present technology have been described above, the present technology is not limited to the embodiments described above, and it goes without saying that various modifications may be made thereto.

For example, although the maximum imageable range R is calculated on the basis of the current imaging direction and the current angle of view of the drone aircraft 10 and the aircraft performance of the drone aircraft 10 in the first embodiment described above, the present technology is not limited thereto. For example, in the case where the aircraft state table is not updated due to a communication failure between the drone aircraft 10 and the information processing apparatus 30, the information processing apparatus 30 may calculate the maximum imageable range R and the maximum imageable region D on the basis of the upper limit value of the stored aircraft performance of the drone 10, and may generate a moving route that does not intersect this maximum imageable region D.

Further, although an overlay image in which the maximum imageable region D (the imageable region D') of the drone aircraft 10 is virtually superimposed on the video taken by the camera 116 is displayed on the display unit 41 in the embodiments described above, the present technology is not limited thereto. Instead of or in addition to the overlay image, information that calls attention to the user may be displayed on the display unit 41.

Further, although the model number of the drone aircraft 10 is specified by performing image processing on a captured image obtained by imaging the drone aircraft 10 in the embodiments described above, the present technology is not limited thereto. The movable region calculation unit 3021 may acquire information regarding the model number or the model name of the drone aircraft 10 together with the aircraft state table from the drone aircraft 10 and may read, from the storage unit 303, the aircraft performance of the drone aircraft 10 and the camera 101 associated therewith for use.

In addition, although the maximum movable region E is calculated using all the maximum speed, the maximum ascending speed, the maximum descending speed, the maximum acceleration, the maximum ascending acceleration, and the maximum descending acceleration of the drone aircraft 10 in the embodiments described above, the present technology is not limited thereto. At least one of the maximum speed, the maximum ascending speed, the maximum descending speed, the maximum acceleration, the maximum ascending acceleration, or the maximum descending acceleration may be used for calculating the maximum movable region E.

<Supplement>

The embodiments of the present technology may include, for example, the information processing apparatus, the system, the information processing method executed by the information processing apparatus or the system, the program for operating the information processing apparatus, and a non-transitory tangible medium in which the program is recorded, as described above.

Further, although the description has been made on the premise that the moving body is a flying object in the embodiments described above, the present technology is not limited thereto. The present technology may be applied to a moving body (e.g., a robot) other than the flying object, and an application thereof is not particularly limited. Note that the flying object may include, in addition to the drone aircraft, an aircraft, an unmanned aerial vehicle, an unmanned helicopter, and the like.

Further, the effects described herein are not limitative, but are merely descriptive or illustrative. In other words, the present technology may have other effects apparent to those skilled in the art from the description herein together with the effects described above or in place of the effects described above.

The favorable embodiments of the present technology have been described above in detail with reference to the accompanying drawings. However, the present technology is not limited to such examples. It is clear that persons who have common knowledge in the technical field of the present technology could conceive various alterations or modifications within the scope of the technical idea described in the claims. It is understood that of course such alterations or modifications also fall under the technical scope of the present technology.

It should be noted that the present technology may also take the following configurations.

(1)

An information processing apparatus, including:

an acquisition unit that acquires state information of an imaging unit of a moving object; and a control unit that calculates an imageable region of the imaging unit on a basis of the state information, in which the information processing apparatus transmits information regarding the imageable region to a moving body.

(2)

The information processing apparatus according to (1) above, in which the acquisition unit acquires the state information of the moving object and performance information of the moving object, and the control unit calculates the imageable region on a basis of the acquired state information and the acquired performance information of the moving object and the acquired state information of the imaging unit.

(3)

The information processing apparatus according to (2) above, in which the control unit
calculates a movable region of the moving object on a basis of the acquired state information of the moving object and the acquired performance information of the moving object, and
calculates the imageable region on a basis of the calculated movable region.

(4)

The information processing apparatus according to (2) or (3) above, in which the state information of the moving object includes information regarding a current position of the moving object, the performance information of the moving object includes information regarding a maximum speed, a maximum ascending speed, a maximum descending speed, maximum acceleration, maximum ascending acceleration, and maximum descending acceleration of the moving object, and the control unit calculates a movable region of the moving object on a basis of at least one of the maximum speed, the maximum ascending speed, the maximum descending speed, the maximum acceleration, the maximum ascending acceleration, or the maximum descending acceleration, and the current position.

(5)
The information processing apparatus according to any one of (1) to (4) above, in which
the acquisition unit acquires performance information of the imaging unit, and
the control unit calculates an imageable range of the imaging unit on a basis of the state information and the performance information of the imaging unit.

(6)
The information processing apparatus according to (5) above, in which
the state information of the imaging unit includes information regarding an imaging direction and an angle of view of the imaging unit,
the performance information of the imaging unit includes information regarding a changeable range and a change speed of the imaging direction of the imaging unit and information regarding an angle-of-view changeable range and an angle-of-view change speed of the imaging unit, and
the control unit calculates the imageable range on a basis of the imaging direction, the angle of view, the changeable range, the change speed, the angle-of-view changeable range, and the angle-of-view change speed.

(7)
The information processing apparatus according to (5) or (6) above, in which
the control unit
calculates the imageable range every predetermined period of time, and
calculates the imageable region on a basis of the imageable range calculated every predetermined period of time.

(8)
The information processing apparatus according to any one of (1) to (7) above, in which
the information processing apparatus is a server.

(9)
A moving body, including:
an acquisition unit that acquires information regarding an imageable region of an imaging unit of a moving object, the imageable region being calculated on a basis of state information of the imaging unit; and
a control unit that generates a moving route of the moving body, the moving route not intersecting the imageable region.

(10)
The moving body according to (9) above, in which
the moving body is a flying object.

(11)
A moving body, including:
an acquisition unit that acquires state information of an imaging unit of a moving object; and
a control unit that calculates an imageable region of the imaging unit on a basis of the state information and generates a moving route of the moving body, the moving route not intersecting the imageable region.

(12)
The moving body according to (11) above, in which
the moving body is a flying object.

(13)
An information processing system, including:
an information processing apparatus that acquires state information of an imaging unit of a moving object and calculates an imageable region of the imaging unit on a basis of the state information; and
a moving body that acquires information regarding the imageable region from the information processing apparatus and generates a moving route of the moving body, the moving route not intersecting the imageable region.

(14)
An information processing method for an information processing apparatus, including:
acquiring state information of an imaging unit of a moving object;
calculating an imageable region of the imaging unit on a basis of the state information; and
transmitting information regarding the imageable region to a moving body.

(15)
A program that causes an information processing apparatus to execute the steps of:
acquiring state information of an imaging unit of a moving object;
calculating an imageable region of the imaging unit on a basis of the state information; and
transmitting information regarding the imageable region to a moving body.

REFERENCE SIGNS LIST drone aircraft 10,20
information processing apparatus 30,100
control unit 106,202,302
communication unit (acquisition unit) 107,201,301
imageable range R'
maximum imageable range R
movable region E'
maximum movable region E
imageable region D'
maximum imageable region D
moving route L,L'

The invention claimed is:
1. An information processing apparatus, comprising:
circuitry configured to
acquire object state information of a first moving object, the first moving object including a camera,
acquire camera state information and camera performance information of the camera of the first moving object, the camera state information of the camera including information regarding an imaging direction and an angle of view of the camera, the camera performance information of the camera including information regarding an imaging direction changeable range and an imaging direction change speed of the camera and information regarding an angle-of-view changeable range and an angle-of-view change speed of the camera,
calculate an imageable range of the camera on a basis of the camera state information and the camera performance information of the camera,
calculate an imageable region of the camera on a basis of the object state information and the calculated imageable range of the camera, and
control transmission of information regarding the imageable region to a second moving object.

2. The information processing apparatus according to claim 1, wherein
the circuitry acquires object performance information of the first moving object, and the circuitry calculates the imageable region of the camera on a basis of the acquired object state information, the acquired object performance information of the first moving object and the calculated imageable range of the camera.

3. The information processing apparatus according to claim 2, wherein
the circuitry
calculates a movable region of the first moving object on a basis of the acquired object state information of the first moving object and the acquired object performance information of the first moving object, and
calculates the imageable region on a basis of the calculated movable region.

4. The information processing apparatus according to claim 2, wherein
the object state information of the first moving object includes information regarding a current position of the first moving object,
the object performance information of the first moving object includes information regarding a maximum speed, a maximum ascending speed, a maximum descending speed, maximum acceleration, maximum ascending acceleration, and maximum descending acceleration of the first moving object, and
the circuitry calculates a movable region of the first moving object on a basis of at least one of the maximum speed, the maximum ascending speed, the maximum descending speed, the maximum acceleration, the maximum ascending acceleration, or the maximum descending acceleration, and the current position.

5. The information processing apparatus according to claim 1, wherein
the circuitry
calculates the imageable range of the camera every predetermined period of time, and
calculates the imageable region on a basis of the imageable range calculated every predetermined period of time.

6. The information processing apparatus according to claim 1, wherein
the information processing apparatus is a server.

7. The information processing apparatus according to claim 1, wherein
the circuitry is further configured to predict the imageable region of the camera at a predetermined time based on history data of the camera state information of the camera of the first moving object.

8. The information processing apparatus according to claim 7, wherein
the circuitry predicts the imageable region of the camera at the predetermined time, by selecting a first imaging direction change range that is similar to a current imaging direction and a first angle of view of the camera that is similar to a current angle of view of the camera, from the history data, and calculating the imageable region of the camera on a basis of the first imaging direction change range and the first angle of view of the camera.

9. The information processing apparatus according to claim 1, wherein
the information processing apparatus further comprises a display, and the circuitry is further configured to generate an overlay image in which the calculated imageable region of the camera is virtually superimposed on a real time image taken by the camera, and
the circuitry is further configured to display the overlay image on the display.

10. A moving body, comprising:
circuitry configured to
acquire information regarding an imageable region of a camera of another moving body, the imageable region being calculated on a basis of object state information of the other moving body and imageable range of the camera of the other moving body, the imageable range of the camera being calculated on a basis of camera state information and camera performance information of the camera, the camera state information of the camera including information regarding an imaging direction and an angle of view of the camera, the camera performance information of the camera including information regarding an imaging direction changeable range and an imaging direction change speed of the camera and information regarding an angle-of-view changeable range and an angle-of-view change speed of the camera, and
generate a moving route of the moving body, the moving route not intersecting the imageable region of the camera of the other moving body.

11. The moving body according to claim 10, wherein
the moving body is a flying object.

12. A moving body, comprising:
circuitry configured to
acquire camera state information of a camera of another moving body, and
calculate an imageable region of the camera on a basis of object state information of the other moving body and imageable range of the camera of the other moving body, the and imageable range of the camera being calculated on a basis of the camera state information and camera performance information of the camera, the camera state information of the camera including information regarding an imaging direction and an angle of view of the camera, the camera performance information of the camera including information regarding an imaging direction changeable range and an imaging direction change speed of the camera and information regarding an angle-of-view changeable range and an angle-of-view change speed of the camera, and
generate a moving route of the moving body, the moving route not intersecting the imageable region of the camera of the other moving body.

13. The moving body according to claim 12, wherein
the moving body is a flying object.

14. An information processing system, comprising:
an information processing apparatus that acquires object state information of a first moving object, camera state information and camera performance information of the camera of the first moving object, the camera state information of the camera including information regarding an imaging direction and an angle of view of the camera, the camera performance information of the camera including information regarding an imaging direction changeable range and an imaging direction change speed of the camera and information regarding an angle-of-view changeable range and an angle-of-view change speed of the camera, calculates an imageable range of the camera on a basis of the camera state information and the camera performance information of the camera, and calculates an imageable region of the camera on a basis of the object state information and the calculated imageable range of the camera; and a second moving object that acquires information regarding the imageable region from the information processing apparatus and generates a moving route of the second moving object, the moving route not intersecting the imageable region of the camera of the first moving object.

15. The information processing system according to claim 14, wherein the information processing apparatus further comprises a display, the information processing apparatus generates an overlay image in which the calculated imageable region of the camera is virtually superimposed on a real time image taken by the camera, and the information processing apparatus displays the overlay image on the display.

16. An information processing method for an information processing apparatus, comprising:

acquiring object state information of a first moving object;

acquiring camera state information and camera performance information of a camera of the first moving object, the camera state information of the camera including information regarding an imaging direction and an angle of view of the camera, the camera performance information of the camera including information regarding an imaging direction changeable range and an imaging direction change speed of the imaging direction of the camera and information regarding an angle-of-view changeable range and an angle-of-view change speed of the camera;

calculating an imageable range of the camera on a basis of the camera state information and the camera performance information of the camera;

calculating an imageable region of the camera on a basis of the object state information and the calculated imageable range of the camera; and controlling transmission of information regarding the imageable region to a second moving object.

17. The information processing method according to claim 16, further comprising:

predicting the imageable region of the camera at a predetermined time based on history data of the camera state information of the camera of the first moving object.

18. The information processing method according to claim 17, further comprising:

predicting the imageable region of the camera at the predetermined time, by selecting a first imaging direction change range that is similar to a current imaging direction and a first angle of view of the camera that is similar to a current angle of view of the camera, from the history data, and calculating the imageable region of the camera on a basis of the first imaging direction change range and the first angle of view of the camera.

19. A non-transitory computer-readable storage medium including computer executable instructions, wherein the instructions, when executed by an information processing apparatus, cause the information processing apparatus to perform a method, the method comprising:

acquiring object state information of a first moving object;

acquiring camera state information and camera performance information of a camera of the first moving object, the camera state information of the camera including information regarding an imaging direction and an angle of view of the camera, the camera performance information of the camera including information regarding an imaging direction changeable range and an imaging direction change speed of the imaging direction of the camera and information regarding an angle-of-view changeable range and an angle-of-view change speed of the camera;

calculating an imageable range of the camera on a basis of the camera state information and the camera performance information of the camera;

calculating an imageable region of the camera on a basis of the object state information and the calculated imageable range of the camera; and controlling transmission of information regarding the imageable region to a second moving object.

* * * * *